(12) United States Patent
Muthu et al.

(10) Patent No.: US 10,395,223 B2
(45) Date of Patent: Aug. 27, 2019

(54) SYSTEM AND METHOD FOR TRANSFERRING FUNDS

(71) Applicant: Early Warning Services, LLC, Scottsdale, AZ (US)

(72) Inventors: Sri Saravana Muthu, San Francisco, CA (US); John G. Feldman, Matthews, NC (US); Esther Pigg, Duluth, GA (US); Jeffrey Cornman, San Francisco, CA (US); Alfonso McMillian, Charlotte, NC (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 240 days.

(21) Appl. No.: 13/782,587

(22) Filed: Mar. 1, 2013

(65) Prior Publication Data

US 2013/0238492 A1 Sep. 12, 2013

Related U.S. Application Data

(60) Provisional application No. 61/607,882, filed on Mar. 7, 2012, provisional application No. 61/657,339, filed on Jun. 8, 2012.

(51) Int. Cl.
*G06Q 20/10* (2012.01)
*G06Q 20/38* (2012.01)
*G06Q 20/40* (2012.01)

(52) U.S. Cl.
CPC ........... *G06Q 20/10* (2013.01); *G06Q 20/385* (2013.01); *G06Q 20/405* (2013.01)

(58) Field of Classification Search
USPC .................................................... 705/35, 44
See application file for complete search history.

(56) References Cited

U.S. PATENT DOCUMENTS

| 2,011,032 A | 8/1935 | Blanchard |
| 5,229,764 A | 7/1993 | Matchett et al. |

(Continued)

FOREIGN PATENT DOCUMENTS

| AU | 4034997 | 3/1998 |
| AU | 1757201 | 5/2001 |

(Continued)

OTHER PUBLICATIONS

Reframing the Infomated Household-Workplace; Gayle C. Avery, Ellen Baker; Information & Organization, 2002, vol. 12, Aug. 2001.

(Continued)

*Primary Examiner* — William E Rankins
(74) *Attorney, Agent, or Firm* — Bryan Cave Leighton Paisner LLP

(57) ABSTRACT

A method for facilitating transfer of funds from a sender to a recipient, the method comprising: receiving a funds transfer request from the sender having a first account at a first financial institution, determining that the recipient is not registered with the payment network, transmitting an invitation to the recipient to join the payment network, receiving the token from the recipient in response to the invitation, collecting identifying information from the recipient including information, including an account number, regarding the second account, creating a first record for the recipient in a database of registered users, and creating a second record for the recipient in an out-of-network database, the second record including the account number for the second account.

15 Claims, 11 Drawing Sheets

(56) References Cited

U.S. PATENT DOCUMENTS

| | | | |
|---|---|---|---|
| 5,282,249 A | 1/1994 | Cohen et al. |
| 5,283,829 A | 2/1994 | Anderson |
| 5,329,589 A | 7/1994 | Fraser et al. |
| 5,383,113 A | 1/1995 | Kight et al. |
| 5,453,601 A | 9/1995 | Rosen |
| 5,455,407 A | 10/1995 | Rosen |
| 5,465,206 A | 11/1995 | Hilt et al. |
| 5,481,609 A | 1/1996 | Cohen et al. |
| 5,619,657 A | 4/1997 | Sudama et al. |
| 5,642,419 A | 6/1997 | Rosen |
| 5,649,117 A | 7/1997 | Landry |
| 5,652,786 A | 7/1997 | Rogers |
| 5,671,280 A | 9/1997 | Rosen |
| 5,677,955 A | 10/1997 | Doggett et al. |
| 5,699,528 A | 12/1997 | Hogan |
| 5,703,344 A | 12/1997 | Bezy et al. |
| 5,729,594 A | 3/1998 | Klingman |
| 5,745,886 A | 4/1998 | Rosen |
| 5,781,723 A | 7/1998 | Yee et al. |
| 5,790,677 A | 8/1998 | Fox et al. |
| 5,826,241 A | 10/1998 | Stein et al. |
| 5,832,460 A | 11/1998 | Bednar et al. |
| 5,848,161 A | 12/1998 | Luneau et al. |
| 5,848,400 A | 12/1998 | Chang |
| 5,870,473 A | 2/1999 | Boesch et al. |
| 5,873,072 A | 2/1999 | Kight et al. |
| 5,878,141 A | 3/1999 | Daly et al. |
| 5,884,288 A | 3/1999 | Chang et al. |
| 5,889,863 A | 3/1999 | Weber |
| 5,903,721 A | 5/1999 | Sixtus |
| 5,913,203 A | 6/1999 | Wong et al. |
| 5,915,023 A | 6/1999 | Bernstein |
| 5,920,848 A | 7/1999 | Schutzer et al. |
| 5,946,669 A | 8/1999 | Polk |
| 5,956,700 A | 9/1999 | Landry |
| 5,970,475 A | 10/1999 | Barnes et al. |
| 5,978,840 A | 11/1999 | Nguyen et al. |
| 5,983,208 A | 11/1999 | Haller et al. |
| 5,987,132 A | 11/1999 | Rowney |
| 5,987,140 A | 11/1999 | Rowney et al. |
| 5,996,076 A | 11/1999 | Rowney et al. |
| 5,999,625 A | 12/1999 | Bellare et al. |
| 6,002,767 A | 12/1999 | Kramer |
| 6,016,484 A | 1/2000 | Williams et al. |
| 6,029,150 A | 2/2000 | Kravitz |
| 6,032,133 A | 2/2000 | Hilt et al. |
| 6,035,285 A | 3/2000 | Schlect et al. |
| 6,039,250 A | 3/2000 | Ito et al. |
| 6,044,362 A | 3/2000 | Neely |
| 6,049,786 A | 4/2000 | Smorodinsky |
| 6,058,380 A | 5/2000 | Anderson et al. |
| 6,061,665 A | 5/2000 | Bahreman |
| 6,070,150 A | 5/2000 | Remington et al. |
| 6,072,870 A | 6/2000 | Nguyen et al. |
| 6,078,907 A | 6/2000 | Lamm |
| 6,081,790 A | 6/2000 | Rosen |
| 6,085,168 A | 7/2000 | Mori et al. |
| 6,112,181 A | 8/2000 | Shear et al. |
| 6,119,101 A | 9/2000 | Peckover |
| 6,119,106 A | 9/2000 | Mersky et al. |
| 6,119,107 A | 9/2000 | Polk |
| 6,125,352 A | 9/2000 | Franklin et al. |
| 6,128,603 A | 10/2000 | Dent et al. |
| 6,138,107 A | 10/2000 | Elgamal |
| 6,145,738 A | 11/2000 | Stinson et al. |
| 6,167,378 A | 12/2000 | Webber, Jr. |
| 6,173,272 B1 | 1/2001 | Thomas et al. |
| 6,236,981 B1 | 5/2001 | Hill |
| 6,246,996 B1 | 6/2001 | Stein et al. |
| 6,260,024 B1 | 7/2001 | Shkedy |
| 6,285,991 B1 | 9/2001 | Powar |
| 6,289,322 B1 | 9/2001 | Kitchen et al. |
| 6,292,211 B1 | 9/2001 | Pena |
| 6,292,789 B1 | 9/2001 | Schutzer |
| 6,304,857 B1 | 10/2001 | Heindel et al. |
| 6,304,860 B1 | 10/2001 | Martin, Jr. et al. |
| 6,311,170 B1 | 10/2001 | Embrey |
| 6,317,745 B1 | 11/2001 | Thomas et al. |
| 6,334,116 B1 | 12/2001 | Ganesan et al. |
| 6,381,582 B1 | 4/2002 | Walker et al. |
| 6,385,595 B1 | 5/2002 | Kolling |
| 6,411,942 B1 | 6/2002 | Fujimoto |
| 6,438,527 B1 | 8/2002 | Powar |
| 6,446,051 B1 | 9/2002 | Gupta |
| 6,488,203 B1 | 12/2002 | Stoutenburg et al. |
| 6,502,747 B1 | 1/2003 | Stoutenburg et al. |
| 6,578,015 B1 | 6/2003 | Haseltine et al. |
| 6,587,550 B2 | 7/2003 | Council et al. |
| 6,594,647 B1 | 7/2003 | Randle et al. |
| 6,609,114 B1 | 8/2003 | Gressel et al. |
| 6,647,376 B1 | 11/2003 | Farrar et al. |
| 6,678,664 B1 | 1/2004 | Ganesan |
| 6,839,687 B1 | 1/2005 | Dent et al. |
| 6,847,708 B1 | 1/2005 | Abbasi et al. |
| 6,868,391 B1 | 3/2005 | Hultgren |
| 6,882,986 B1 | 4/2005 | Heinemann et al. |
| 6,968,319 B1 | 11/2005 | Remington et al. |
| 6,996,542 B1 | 2/2006 | Landry |
| 7,003,480 B2 | 2/2006 | Fox et al. |
| 7,004,382 B2 | 2/2006 | Sandru |
| 7,010,512 B1 | 3/2006 | Gillin et al. |
| 7,031,939 B1 | 4/2006 | Gallagher et al. |
| 7,035,821 B1 | 4/2006 | Smith, II et al. |
| 7,039,951 B1 | 5/2006 | Chaudhari et al. |
| 7,051,001 B1 | 5/2006 | Slater |
| 7,089,208 B1 * | 8/2006 | Levchin ............... G06Q 20/02 705/35 |
| 7,098,783 B2 | 8/2006 | Crichlow |
| 7,120,606 B1 | 10/2006 | Ranzini et al. |
| 7,120,608 B1 | 10/2006 | Gallagher et al. |
| 7,133,835 B1 | 11/2006 | Fusz et al. |
| 7,184,980 B2 | 2/2007 | Allen-Rouman et al. |
| 7,191,151 B1 * | 3/2007 | Nosek ............... G06Q 20/023 705/39 |
| 7,200,551 B1 | 4/2007 | Senez |
| 7,206,938 B2 | 4/2007 | Bender et al. |
| 7,227,950 B2 | 6/2007 | Faith et al. |
| 7,240,031 B1 | 7/2007 | Kight et al. |
| 7,249,098 B2 | 7/2007 | Milberger et al. |
| 7,287,009 B1 | 10/2007 | Liebermann |
| 7,296,004 B1 | 11/2007 | Garrison et al. |
| 7,302,411 B2 | 11/2007 | Ganesan et al. |
| 7,319,855 B1 | 1/2008 | Brune et al. |
| 7,321,874 B2 | 1/2008 | Dilip et al. |
| 7,321,875 B2 | 1/2008 | Dilip et al. |
| 7,333,953 B1 | 2/2008 | Banaugh et al. |
| 7,353,203 B1 | 4/2008 | Kriplani et al. |
| 7,366,695 B1 | 4/2008 | Allen-Rouman et al. |
| 7,370,014 B1 | 5/2008 | Vasavada et al. |
| 7,376,587 B1 | 5/2008 | Neofytides et al. |
| 7,383,223 B1 | 6/2008 | Dilip et al. |
| 7,383,226 B2 | 6/2008 | Kight et al. |
| 7,389,917 B2 | 6/2008 | Abraham et al. |
| 7,392,223 B1 | 6/2008 | Ganesan et al. |
| 7,395,241 B1 | 7/2008 | Cook et al. |
| 7,398,252 B2 | 7/2008 | Neofytides et al. |
| 7,426,492 B1 | 9/2008 | Bishop et al. |
| 7,450,010 B1 | 11/2008 | Gravelle et al. |
| 7,451,114 B1 | 11/2008 | Matsuda et al. |
| 7,475,039 B2 | 1/2009 | Remington et al. |
| 7,475,808 B1 | 1/2009 | Bishop et al. |
| 7,478,066 B2 | 1/2009 | Remington et al. |
| 7,505,937 B2 | 3/2009 | Dilip et al. |
| 7,519,560 B2 | 4/2009 | Lam et al. |
| 7,532,122 B2 | 5/2009 | Aull et al. |
| 7,536,722 B1 | 5/2009 | Saltz et al. |
| 7,596,701 B2 | 9/2009 | Varghese et al. |
| 7,603,311 B1 | 10/2009 | Yadav-Ranjan |
| 7,606,734 B2 | 10/2009 | Baig et al. |
| 7,606,787 B2 | 10/2009 | Keown et al. |
| 7,610,245 B2 | 10/2009 | Dent et al. |
| 7,613,653 B2 | 11/2009 | Milberger et al. |
| 7,620,602 B2 | 11/2009 | Jakstadt et al. |
| 7,644,037 B1 | 1/2010 | Ostrovsky |

(56) References Cited

U.S. PATENT DOCUMENTS

| | | | |
|---|---|---|---|
| 7,653,591 B1 | 1/2010 | Dabney | |
| 7,657,497 B2 | 2/2010 | Nandy | |
| 7,677,438 B2 | 3/2010 | DeJean et al. | |
| 7,685,067 B1 * | 3/2010 | Britto | G06Q 20/10 235/379 |
| 7,689,482 B2 | 3/2010 | Lam et al. | |
| 7,693,791 B2 | 4/2010 | Hahn-Carlson et al. | |
| 7,702,579 B2 | 4/2010 | Neely et al. | |
| 7,707,082 B1 | 4/2010 | Lapstun et al. | |
| 7,707,107 B2 | 4/2010 | Gebb et al. | |
| 7,711,690 B1 | 5/2010 | Garrison et al. | |
| 7,716,127 B2 | 5/2010 | Gebb et al. | |
| 7,716,132 B1 | 5/2010 | Spies et al. | |
| 7,720,754 B1 | 5/2010 | Gutierrez-Sheris | |
| 7,720,756 B2 | 5/2010 | Kavounas | |
| 7,734,543 B2 | 6/2010 | Braco | |
| 7,752,130 B2 | 7/2010 | Byrd et al. | |
| 7,756,785 B2 | 7/2010 | Gebb et al. | |
| 7,756,786 B2 | 7/2010 | Trende et al. | |
| 7,765,156 B2 | 7/2010 | Staniar et al. | |
| 7,769,687 B2 | 8/2010 | Gebb et al. | |
| 7,774,271 B1 | 8/2010 | Edwards et al. | |
| 7,778,901 B2 | 8/2010 | Ganesan et al. | |
| 7,783,567 B1 | 8/2010 | Kleiman et al. | |
| 7,792,749 B2 | 9/2010 | Ganesan | |
| 7,809,650 B2 | 10/2010 | Bruesewitz et al. | |
| 7,840,520 B2 | 11/2010 | Nandy | |
| 7,848,972 B1 | 12/2010 | Sharma | |
| 7,856,384 B1 | 12/2010 | Kulasooriya et al. | |
| 7,870,070 B2 | 1/2011 | Meier et al. | |
| 7,873,573 B2 | 1/2011 | Realini | |
| 7,877,325 B2 | 1/2011 | Bishop et al. | |
| 7,885,869 B2 | 2/2011 | Uehara et al. | |
| 7,899,744 B2 | 3/2011 | Bishop et al. | |
| 7,904,385 B2 | 3/2011 | Bishop et al. | |
| 7,908,214 B2 | 3/2011 | Bishop et al. | |
| 7,925,585 B2 | 4/2011 | Bishop et al. | |
| 7,937,312 B1 | 5/2011 | Woolston | |
| 7,941,367 B2 | 5/2011 | Bishop et al. | |
| 7,941,372 B2 | 5/2011 | Bishop et al. | |
| 7,942,321 B2 | 5/2011 | Linton et al. | |
| 7,945,491 B2 | 5/2011 | Sharma | |
| 7,953,660 B2 | 5/2011 | Ganesan et al. | |
| 7,958,030 B2 | 6/2011 | Kemper et al. | |
| 7,958,049 B2 | 6/2011 | Jamison et al. | |
| 7,962,406 B2 | 6/2011 | Bishop et al. | |
| 7,962,407 B2 | 6/2011 | Bishop et al. | |
| 7,962,408 B2 | 6/2011 | Bishop et al. | |
| 7,970,706 B2 | 6/2011 | Keene | |
| 7,979,348 B2 | 7/2011 | Thomas et al. | |
| 7,979,349 B2 | 7/2011 | Bishop et al. | |
| 7,996,307 B2 | 8/2011 | Bishop et al. | |
| 7,996,310 B1 | 8/2011 | Edwards et al. | |
| 8,020,005 B2 | 9/2011 | Mani et al. | |
| 8,041,606 B2 | 10/2011 | Mascavage, III et al. | |
| 8,050,997 B1 | 11/2011 | Nosek et al. | |
| 8,060,389 B2 | 11/2011 | Johnson | |
| 8,069,115 B2 | 11/2011 | Schoenberg et al. | |
| 8,073,772 B2 | 12/2011 | Bishop et al. | |
| 8,073,773 B2 | 12/2011 | Kozee et al. | |
| 8,086,497 B1 | 12/2011 | Oakes, III | |
| 8,103,584 B2 | 1/2012 | Bishop et al. | |
| 8,103,585 B2 | 1/2012 | Bishop et al. | |
| 8,112,354 B2 | 2/2012 | Lalwani | |
| 8,121,894 B2 | 2/2012 | Mason | |
| 8,121,945 B2 | 2/2012 | Rackley et al. | |
| 8,123,124 B2 | 2/2012 | Salazar et al. | |
| 8,126,793 B2 | 2/2012 | Jones | |
| 8,165,934 B2 | 4/2012 | Manista et al. | |
| 8,165,958 B1 | 4/2012 | McLaughlin et al. | |
| 8,180,706 B2 | 5/2012 | Bishop et al. | |
| 8,190,514 B2 | 5/2012 | Bishop et al. | |
| 8,195,565 B2 | 6/2012 | Bishop et al. | |
| 8,229,850 B2 | 7/2012 | Dilip et al. | |
| 8,234,212 B2 | 7/2012 | Bishop et al. | |
| 8,244,609 B2 | 8/2012 | Prakash et al. | |
| 8,249,965 B2 | 8/2012 | Tumminaro | |
| 8,249,983 B2 | 8/2012 | Dilip et al. | |
| 8,255,278 B1 | 8/2012 | Young et al. | |
| 8,255,327 B2 | 8/2012 | Kemper et al. | |
| 8,255,336 B2 | 8/2012 | Dilip et al. | |
| 8,266,028 B2 | 9/2012 | Bulman et al. | |
| 8,266,065 B2 | 9/2012 | Dilip et al. | |
| 8,275,704 B2 | 9/2012 | Bishop et al. | |
| 8,290,835 B2 | 10/2012 | Homer et al. | |
| 8,290,862 B2 | 10/2012 | Sheehan et al. | |
| 8,290,863 B2 | 10/2012 | Sheehan et al. | |
| 8,311,913 B2 | 11/2012 | Marchetti et al. | |
| 8,311,914 B2 | 11/2012 | Marchetti et al. | |
| 8,311,937 B2 | 11/2012 | Marchetti et al. | |
| 8,311,942 B1 | 11/2012 | Mason | |
| 8,321,341 B2 | 11/2012 | Nandy | |
| 8,310,346 B2 | 12/2012 | Burbridge et al. | |
| 8,341,046 B2 | 12/2012 | Marchetti et al. | |
| 8,342,407 B2 | 1/2013 | Williams et al. | |
| 8,352,365 B1 | 1/2013 | Goldberg et al. | |
| 8,370,639 B2 | 2/2013 | Azar et al. | |
| 8,374,932 B2 | 2/2013 | Marchetti et al. | |
| 8,380,177 B2 | 2/2013 | Laracey | |
| 8,380,591 B1 | 2/2013 | Kazenas et al. | |
| 8,380,622 B2 | 2/2013 | Bushman et al. | |
| 8,401,939 B2 | 3/2013 | Lam et al. | |
| 8,407,124 B2 | 3/2013 | Uehara et al. | |
| 8,407,141 B2 | 3/2013 | Mullen et al. | |
| 8,417,628 B2 | 4/2013 | Poplawski et al. | |
| 8,423,460 B2 | 4/2013 | Kay et al. | |
| 8,433,629 B2 | 4/2013 | Murtaugh et al. | |
| 8,458,086 B2 | 6/2013 | Bishop et al. | |
| 8,458,774 B2 | 6/2013 | Ganesan | |
| 8,467,766 B2 | 6/2013 | Rackley et al. | |
| 8,484,104 B1 | 7/2013 | Hurlbutt et al. | |
| 8,498,914 B2 | 7/2013 | Hazelhurst | |
| 8,521,657 B2 | 8/2013 | Kuebert et al. | |
| 8,527,413 B2 | 9/2013 | Heller | |
| 8,532,021 B2 | 9/2013 | Tumminaro | |
| 8,533,079 B2 | 9/2013 | Sharma | |
| 8,549,601 B2 | 10/2013 | Ganesan | |
| 8,560,417 B2 | 10/2013 | Mullen et al. | |
| 8,596,527 B2 | 12/2013 | Bishop et al. | |
| 8,606,640 B2 | 12/2013 | Brody et al. | |
| 8,615,457 B2 | 12/2013 | Mullen et al. | |
| 8,634,559 B2 | 1/2014 | Brown et al. | |
| 8,646,685 B2 | 2/2014 | Bishop et al. | |
| 8,666,865 B2 | 3/2014 | Mullen et al. | |
| 8,706,641 B2 | 4/2014 | Bruesewitz et al. | |
| 8,713,325 B2 | 4/2014 | Ganesan | |
| 8,719,905 B2 | 5/2014 | Ganesan | |
| 8,738,526 B2 | 5/2014 | Nosek et al. | |
| 8,745,699 B2 | 6/2014 | Ganesan | |
| 8,751,347 B2 | 6/2014 | Mullen et al. | |
| 8,769,784 B2 | 7/2014 | Ganesan et al. | |
| 8,775,306 B2 | 7/2014 | Nosek et al. | |
| 8,789,153 B2 | 7/2014 | Ganesan | |
| 8,794,509 B2 | 8/2014 | Bishop et al. | |
| 8,806,592 B2 | 8/2014 | Ganesan | |
| 8,814,039 B2 | 8/2014 | Bishop et al. | |
| 8,820,633 B2 | 9/2014 | Bishop et al. | |
| 8,887,247 B2 | 11/2014 | Ganesan | |
| 8,893,237 B2 | 11/2014 | Ganesan | |
| 8,938,787 B2 | 1/2015 | Turgeman | |
| 9,626,664 B2 | 4/2017 | Bouey et al. | |
| 9,691,056 B2 | 6/2017 | Bouey et al. | |
| 2002/0023054 A1 * | 2/2002 | Gillespie | 705/39 |
| 2002/0029193 A1 | 3/2002 | Ranjan et al. | |
| 2002/0052852 A1 | 5/2002 | Bozeman | |
| 2002/0091635 A1 | 7/2002 | Dilip et al. | |
| 2002/0128932 A1 | 9/2002 | Yung et al. | |
| 2002/0143634 A1 | 10/2002 | Kumar et al. | |
| 2002/0194503 A1 | 12/2002 | Faith et al. | |
| 2003/0014316 A1 | 1/2003 | Jaalinoja et al. | |
| 2003/0115151 A1 | 6/2003 | Wheeler et al. | |
| 2003/0126094 A1 | 7/2003 | Fisher et al. | |
| 2003/0220875 A1 | 11/2003 | Lam et al. | |
| 2003/0220876 A1 | 11/2003 | Burger et al. | |

(56) References Cited

U.S. PATENT DOCUMENTS

| | | |
|---|---|---|
| 2003/0236728 A1 | 12/2003 | Sunderji et al. |
| 2004/0034594 A1 | 2/2004 | Thomas et al. |
| 2004/0089711 A1 | 5/2004 | Sandru |
| 2004/0158522 A1 | 8/2004 | Brown et al. |
| 2004/0193522 A1 | 9/2004 | Binet et al. |
| 2004/0230489 A1 | 11/2004 | Goldthwaite et al. |
| 2004/0259626 A1* | 12/2004 | Akram et al. ............ 463/17 |
| 2005/0008148 A1 | 1/2005 | Jacobson |
| 2005/0010523 A1 | 1/2005 | Myklebust et al. |
| 2005/0010786 A1 | 1/2005 | Michener et al. |
| 2005/0069135 A1 | 3/2005 | Brickell |
| 2005/0080716 A1 | 4/2005 | Belyi et al. |
| 2005/0125347 A1 | 6/2005 | Akialis et al. |
| 2005/0137948 A1 | 6/2005 | Kissner et al. |
| 2005/0149455 A1 | 7/2005 | Bruesewitz et al. |
| 2005/0187873 A1 | 8/2005 | Labrou |
| 2005/0246292 A1 | 11/2005 | Sarcanin |
| 2005/0273842 A1* | 12/2005 | Wright et al. ............ 726/1 |
| 2005/0274793 A1 | 12/2005 | Cantini et al. |
| 2005/0289061 A1 | 12/2005 | Kulakowski |
| 2006/0000892 A1 | 1/2006 | Bonalle |
| 2006/0014532 A1 | 1/2006 | Seligmann |
| 2006/0080727 A1 | 4/2006 | Hammons et al. |
| 2006/0106717 A1 | 5/2006 | Randle et al. |
| 2006/0149632 A1 | 7/2006 | Bhatti et al. |
| 2006/0149635 A1 | 7/2006 | Bhatti et al. |
| 2006/0161772 A1 | 7/2006 | Talstra et al. |
| 2006/0165060 A1 | 7/2006 | Dua |
| 2006/0224470 A1 | 10/2006 | Ruano et al. |
| 2006/0258397 A1 | 11/2006 | Kaplan et al. |
| 2006/0280339 A1 | 12/2006 | Cho |
| 2006/0287004 A1 | 12/2006 | Fuqua |
| 2006/0287963 A1 | 12/2006 | Steeves et al. |
| 2007/0046456 A1* | 3/2007 | Edwards ............ G08B 25/14 340/539.1 |
| 2007/0061590 A1 | 3/2007 | Boye et al. |
| 2007/0106892 A1 | 5/2007 | Engberg |
| 2007/0108269 A1 | 5/2007 | Benco et al. |
| 2007/0136167 A1 | 6/2007 | Dilip et al. |
| 2007/0136168 A1 | 6/2007 | Dilip et al. |
| 2007/0136169 A1 | 6/2007 | Dilip et al. |
| 2007/0168281 A1 | 7/2007 | Bishop et al. |
| 2007/0174189 A1 | 7/2007 | Bishop et al. |
| 2007/0179885 A1* | 8/2007 | Bird ............ G06Q 20/04 705/39 |
| 2007/0198264 A1 | 8/2007 | Chang |
| 2007/0198405 A1 | 8/2007 | Bishop et al. |
| 2007/0198406 A1 | 8/2007 | Bishop et al. |
| 2007/0230371 A1 | 10/2007 | Tumminaro |
| 2007/0233615 A1 | 10/2007 | Tumminaro |
| 2007/0236330 A1 | 10/2007 | Cho et al. |
| 2007/0244811 A1 | 10/2007 | Tumminaro |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0015985 A1 | 1/2008 | Abhari et al. |
| 2008/0015994 A1 | 1/2008 | Bonalle et al. |
| 2008/0032741 A1 | 2/2008 | Tumminaro |
| 2008/0033880 A1 | 2/2008 | Fiebiger et al. |
| 2008/0046362 A1* | 2/2008 | Easterly ............ G06Q 20/04 705/40 |
| 2008/0082454 A1 | 4/2008 | Dilip et al. |
| 2008/0082828 A1 | 4/2008 | Jennings et al. |
| 2008/0086403 A1 | 4/2008 | Dilip et al. |
| 2008/0086426 A1 | 4/2008 | Dilip et al. |
| 2008/0097873 A1 | 4/2008 | Cohen et al. |
| 2008/0097899 A1 | 4/2008 | Jackson et al. |
| 2008/0109392 A1 | 5/2008 | Nandy |
| 2008/0127319 A1 | 5/2008 | Galloway et al. |
| 2008/0140564 A1* | 6/2008 | Tal ............ G06Q 20/02 705/39 |
| 2008/0141033 A1 | 6/2008 | Ginter et al. |
| 2008/0147536 A1* | 6/2008 | Breen ............ G06Q 20/02 705/38 |
| 2008/0177661 A1 | 7/2008 | Mehra |
| 2008/0189209 A1* | 8/2008 | Loomis ............ G06Q 20/10 705/44 |
| 2008/0208737 A1 | 8/2008 | Dilip et al. |
| 2008/0210751 A1 | 9/2008 | Kim |
| 2008/0210752 A1 | 9/2008 | March |
| 2008/0222048 A1 | 9/2008 | Higgins et al. |
| 2008/0238610 A1 | 10/2008 | Rosenberg |
| 2008/0244271 A1 | 10/2008 | Yu |
| 2008/0244277 A1 | 10/2008 | Orsini et al. |
| 2008/0255993 A1 | 10/2008 | Blinbaum |
| 2008/0294563 A1 | 11/2008 | Boutahar et al. |
| 2008/0306872 A1 | 12/2008 | Felsher |
| 2009/0006861 A1 | 1/2009 | Bemmel |
| 2009/0006920 A1 | 1/2009 | Munson et al. |
| 2009/0030843 A1 | 1/2009 | Hoffman et al. |
| 2009/0043705 A1 | 2/2009 | Bishop et al. |
| 2009/0048885 A1 | 2/2009 | Bishop et al. |
| 2009/0048886 A1 | 2/2009 | Bishop et al. |
| 2009/0048887 A1 | 2/2009 | Bishop et al. |
| 2009/0048951 A1 | 2/2009 | Bishop et al. |
| 2009/0048952 A1 | 2/2009 | Bishop et al. |
| 2009/0048963 A1 | 2/2009 | Bishop et al. |
| 2009/0048966 A1 | 2/2009 | Bishop et al. |
| 2009/0048968 A1 | 2/2009 | Bishop et al. |
| 2009/0048969 A1 | 2/2009 | Bishop et al. |
| 2009/0070272 A1 | 3/2009 | Jain |
| 2009/0076956 A1 | 3/2009 | Bishop et al. |
| 2009/0076957 A1 | 3/2009 | Bishop et al. |
| 2009/0076958 A1 | 3/2009 | Bishop et al. |
| 2009/0083181 A1 | 3/2009 | Bishop et al. |
| 2009/0089193 A1 | 4/2009 | Paintin |
| 2009/0089209 A1 | 4/2009 | Bixler et al. |
| 2009/0099961 A1 | 4/2009 | Ogilvy |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2009/0112747 A1 | 4/2009 | Mullen et al. |
| 2009/0119190 A1 | 5/2009 | Realini |
| 2009/0119212 A1 | 5/2009 | Liu et al. |
| 2009/0125323 A1 | 5/2009 | Lakshmanan et al. |
| 2009/0125426 A1 | 5/2009 | Bishop et al. |
| 2009/0132392 A1 | 5/2009 | Davis et al. |
| 2009/0132423 A1 | 5/2009 | Liu |
| 2009/0138388 A1 | 5/2009 | Bishop et al. |
| 2009/0150269 A1 | 6/2009 | Bishop et al. |
| 2009/0150270 A1 | 6/2009 | Bishop et al. |
| 2009/0150271 A1 | 6/2009 | Bishop et al. |
| 2009/0150288 A1 | 6/2009 | Bishop et al. |
| 2009/0157518 A1 | 6/2009 | Bishop et al. |
| 2009/0157519 A1 | 6/2009 | Bishop et al. |
| 2009/0164324 A1 | 6/2009 | Bishop et al. |
| 2009/0164325 A1 | 6/2009 | Bishop et al. |
| 2009/0164326 A1 | 6/2009 | Bishop et al. |
| 2009/0164327 A1 | 6/2009 | Bishop et al. |
| 2009/0164328 A1 | 6/2009 | Bishop et al. |
| 2009/0164329 A1 | 6/2009 | Bishop et al. |
| 2009/0164330 A1 | 6/2009 | Bishop et al. |
| 2009/0164331 A1 | 6/2009 | Bishop et al. |
| 2009/0228365 A1 | 9/2009 | Tomchek et al. |
| 2009/0265241 A1 | 10/2009 | Bishop et al. |
| 2009/0265249 A1 | 10/2009 | Bishop et al. |
| 2009/0265250 A1 | 10/2009 | Bishop et al. |
| 2009/0265252 A1 | 10/2009 | Fletcher |
| 2009/0271277 A1 | 10/2009 | Bishop et al. |
| 2009/0271278 A1 | 10/2009 | Bishop et al. |
| 2009/0271303 A1 | 10/2009 | Wang et al. |
| 2009/0282259 A1 | 11/2009 | Skorik et al. |
| 2009/0287564 A1 | 11/2009 | Bishop et al. |
| 2009/0287565 A1 | 11/2009 | Bishop et al. |
| 2009/0287601 A1 | 11/2009 | Tumminaro et al. |
| 2009/0289106 A1 | 11/2009 | Bishop et al. |
| 2009/0299841 A1 | 12/2009 | Bishop et al. |
| 2009/0307072 A1 | 12/2009 | Morales-Lema |
| 2009/0319425 A1 | 12/2009 | Tumminaro et al. |

(56) References Cited

U.S. PATENT DOCUMENTS

| | | |
|---|---|---|
| 2009/0327133 A1 | 12/2009 | Aharoni et al. |
| 2010/0030687 A1 | 2/2010 | Panthaki et al. |
| 2010/0031022 A1 | 2/2010 | Kramer |
| 2010/0042539 A1* | 2/2010 | Dheer et al. ............... 705/40 |
| 2010/0057622 A1 | 3/2010 | Faith et al. |
| 2010/0063935 A1 | 3/2010 | Thomas et al. |
| 2010/0094765 A1 | 4/2010 | Nandy |
| 2010/0100480 A1 | 4/2010 | Altman et al. |
| 2010/0115610 A1 | 5/2010 | Tredoux et al. |
| 2010/0131415 A1 | 5/2010 | Sartipi |
| 2010/0161736 A1* | 6/2010 | Picknelly ............ G06Q 10/107 709/206 |
| 2010/0198729 A1 | 8/2010 | Kavounas |
| 2010/0269166 A1 | 10/2010 | Awad et al. |
| 2010/0320266 A1 | 12/2010 | White |
| 2011/0055078 A1 | 3/2011 | Nandy |
| 2011/0055083 A1 | 3/2011 | Grinhute |
| 2011/0066523 A1 | 3/2011 | Harrison |
| 2011/0066551 A1 | 3/2011 | Bruesewitz et al. |
| 2011/0078078 A1 | 3/2011 | Meier et al. |
| 2011/0110508 A1* | 5/2011 | LaFreniere ....... H04M 3/42059 379/142.04 |
| 2011/0112945 A1 | 5/2011 | Cullen, III et al. |
| 2011/0112954 A1 | 5/2011 | Bruesewitz et al. |
| 2011/0191160 A1 | 8/2011 | Blackhurst et al. |
| 2011/0196782 A1* | 8/2011 | Allen .................. G06Q 20/10 705/39 |
| 2011/0202982 A1 | 8/2011 | Alexander et al. |
| 2011/0247058 A1 | 10/2011 | Kisters |
| 2011/0251869 A1* | 10/2011 | Shekhter ............ G06Q 10/0635 705/7.28 |
| 2011/0251952 A1 | 10/2011 | Kelly et al. |
| 2011/0258111 A1* | 10/2011 | Raj ..................... G06Q 20/10 705/39 |
| 2011/0264543 A1 | 10/2011 | Taveau et al. |
| 2011/0264583 A1* | 10/2011 | Cooper et al. ............... 705/40 |
| 2011/0270749 A1 | 11/2011 | Bennett et al. |
| 2011/0276479 A1 | 11/2011 | Thomas |
| 2011/0295746 A1 | 12/2011 | Thomas et al. |
| 2011/0313921 A1* | 12/2011 | Dheer .................. G06Q 20/10 705/42 |
| 2011/0320347 A1 | 12/2011 | Tumminaro et al. |
| 2012/0016731 A1 | 1/2012 | Smith et al. |
| 2012/0041876 A1 | 2/2012 | Nosek et al. |
| 2012/0066121 A1 | 3/2012 | Shahbazi et al. |
| 2012/0116953 A1 | 5/2012 | Klein et al. |
| 2012/0173417 A1 | 7/2012 | Lohman et al. |
| 2012/0203695 A1 | 8/2012 | Morgan et al. |
| 2012/0209766 A1 | 8/2012 | Kitchen et al. |
| 2012/0265687 A1 | 10/2012 | Dilip et al. |
| 2012/0278239 A1 | 11/2012 | Nosek et al. |
| 2012/0284154 A1* | 11/2012 | Creighton ............ G06Q 30/04 705/34 |
| 2012/0284175 A1 | 11/2012 | Wilson et al. |
| 2012/0290453 A1 | 11/2012 | Manista et al. |
| 2013/0018791 A1 | 1/2013 | Mendocino et al. |
| 2013/0036000 A1 | 2/2013 | Giordano et al. |
| 2013/0054452 A1 | 2/2013 | Au et al. |
| 2013/0060708 A1 | 3/2013 | Oskolkov et al. |
| 2013/0073455 A1 | 3/2013 | McLaughlin et al. |
| 2013/0080368 A1 | 3/2013 | Nandy |
| 2013/0085936 A1 | 4/2013 | Law et al. |
| 2013/0117178 A1 | 5/2013 | Mullen et al. |
| 2013/0124405 A1 | 5/2013 | Hamzeh |
| 2013/0124406 A1 | 5/2013 | Poplawski et al. |
| 2013/0138557 A1 | 5/2013 | Mullen et al. |
| 2013/0151384 A1 | 6/2013 | Mullen et al. |
| 2013/0212010 A1 | 8/2013 | Mullen et al. |
| 2013/0226627 A1 | 8/2013 | Kubovcik et al. |
| 2013/0232071 A1 | 9/2013 | Dilip et al. |
| 2013/0238490 A1 | 9/2013 | Bouey et al. |
| 2013/0238491 A1* | 9/2013 | Bouey et al. ................. 705/39 |
| 2013/0246280 A1 | 9/2013 | Kirsch |
| 2013/0262296 A1 | 10/2013 | Thomas et al. |
| 2014/0006184 A1 | 1/2014 | Godsey |
| 2014/0046820 A1 | 2/2014 | Sunderji et al. |
| 2014/0058862 A1 | 2/2014 | Celkonas |
| 2014/0059693 A1* | 2/2014 | Stecher .............. H04L 63/0421 726/26 |
| 2014/0067677 A1 | 3/2014 | Ali et al. |
| 2014/0081783 A1 | 3/2014 | Paranjape et al. |
| 2014/0164246 A1 | 6/2014 | Thomas et al. |
| 2014/0188697 A1 | 7/2014 | Bruesewitz et al. |
| 2014/0188728 A1 | 7/2014 | Dheer et al. |
| 2014/0244515 A1 | 8/2014 | Garfinkle et al. |
| 2014/0310142 A1* | 10/2014 | Mak .............................. 705/35 |
| 2014/0372308 A1 | 12/2014 | Sheets |
| 2016/0283918 A1 | 9/2016 | Weinflash |
| 2016/0300206 A1 | 10/2016 | Novac et al. |
| 2016/0300207 A1 | 10/2016 | Novac et al. |
| 2016/0300225 A1 | 10/2016 | Novac et al. |
| 2016/0300226 A1 | 10/2016 | Novac et al. |
| 2017/0024719 A1 | 1/2017 | Finch et al. |
| 2017/0024744 A1 | 1/2017 | Finch et al. |

FOREIGN PATENT DOCUMENTS

| | | |
|---|---|---|
| AU | 8870801 | 4/2002 |
| AU | 2002252137 | 9/2002 |
| BR | PI0710021 | 8/2011 |
| BR | PI0710089 | 8/2011 |
| CA | 2 229 012 | 3/1997 |
| CA | 2 239 875 | 6/1997 |
| CA | 2 323 500 | 9/1999 |
| CA | 2 329 348 | 11/1999 |
| CA | 2 316 090 | 2/2001 |
| CA | 2 402 353 | 9/2001 |
| CA | 2423048 | 3/2002 |
| CA | 2 437 949 | 8/2002 |
| CA | 2436319 | 2/2004 |
| CA | 2647602 | 3/2008 |
| CA | 2647636 | 3/2008 |
| CN | 101454794 | 6/2009 |
| CN | 101454795 | 6/2009 |
| EP | 865010 | 9/1998 |
| EP | 820620 | 3/1999 |
| EP | 998731 | 5/2000 |
| EP | 1107198 | 6/2001 |
| EP | 1184823 | 3/2002 |
| EP | 1208513 | 5/2002 |
| EP | 1400053 | 3/2004 |
| EP | 1416455 | 5/2004 |
| EP | 1504393 | 2/2005 |
| EP | 2008237 | 12/2008 |
| EP | 2013962 | 1/2009 |
| EP | 2266083 | 12/2010 |
| EP | 2304678 | 4/2011 |
| EP | 2344994 | 7/2011 |
| EP | 2387772 | 11/2011 |
| EP | 2407918 | 1/2012 |
| EP | 2407919 | 1/2012 |
| EP | 2438562 | 4/2012 |
| GB | 2297856 | 8/1996 |
| GB | 2384084 | 7/2003 |
| GB | 2454614 | 5/2009 |
| JP | 09-282367 | 10/1997 |
| JP | 2004532448 | 10/2004 |
| JP | 2008262601 | 10/2008 |
| KR | 1020120075590 | 7/2012 |
| KR | 1020140099676 | 8/2014 |
| MX | 2008012503 | 12/2008 |
| MX | 2008012504 | 5/2009 |
| NL | 1018913 | 3/2003 |
| NL | 1918913 | 3/2003 |
| SE | 9703800 | 4/1999 |
| TW | 200919343 | 5/2009 |
| WO | 97/02539 | 1/1997 |
| WO | 97/16798 | 5/1997 |
| WO | 97/24891 | 5/1999 |
| WO | 1999024891 | 5/1999 |
| WO | 99/34311 | 8/1999 |
| WO | 99/46720 | 9/1999 |
| WO | 00/55793 | 9/2000 |

(56) References Cited

FOREIGN PATENT DOCUMENTS

| WO | 00/58876 | 10/2000 |
|---|---|---|
| WO | 2001033522 | 5/2001 |
| WO | 01/55984 | 8/2001 |
| WO | 01/67364 | 9/2001 |
| WO | 02/25605 | 3/2002 |
| WO | 2002025534 | 3/2002 |
| WO | 02/35429 | 5/2002 |
| WO | 2002069561 | 9/2002 |
| WO | 2003091849 | 11/2003 |
| WO | 2005004026 | 1/2005 |
| WO | 2005/057455 | 6/2005 |
| WO | 2007116368 | 10/2007 |
| WO | 2008011102 | 1/2008 |
| WO | 2008027620 | 3/2008 |
| WO | 2008027621 | 3/2008 |
| WO | 2008110791 | 9/2008 |
| WO | 2009058526 | 5/2009 |
| WO | 2009097215 | 8/2009 |
| WO | 2009114876 | 9/2009 |
| WO | 2009152184 | 12/2009 |
| WO | 2009158420 | 12/2009 |
| WO | 2010082960 | 7/2010 |
| WO | 2010083113 | 7/2010 |
| WO | 2010138358 | 12/2010 |
| WO | 2010138359 | 12/2010 |
| WO | 2010138611 | 12/2010 |
| WO | 2010138613 | 12/2010 |
| WO | 2010138615 | 12/2010 |
| WO | 2010141662 | 12/2010 |
| WO | 2011008625 | 1/2011 |
| WO | 2011137082 | 11/2011 |
| WO | 2011163525 | 12/2011 |
| WO | 2012075187 | 6/2012 |
| WO | 2017011596 | 1/2017 |
| WO | 2017014815 | 1/2017 |

OTHER PUBLICATIONS

Electronic Cash and Monetary Policy; Mark Bernkopf; First Monday, vol. 1, No. 1-6, May 1996.

Electronic Payment Systems in European Countries; Country Synthesis Report; Final Version, Sep. 1999; Böhle, Rader, Riehm, Institut für Technikfolgenabschätzung und Systemanalyse for the European Science and Technology Observatory Network (ESTO).

Electronic Money in the 1990s: A Net Benefit or Merely a Trade-Off?; Mark E. Budnitz; HeinOnline—9 Ga. St. U. L. Rev. 747 1992-1993.

Digital Money—A Survey; Chida, Mambo, Shizuya; Graduate School of Information Sciences, Tohoku University; Received Jun. 15, 2001; Revised Aug. 21, 2001; Interdisciplinary Information Sciences. vol. 7, No. 2, pp. 135-165 (2001).

Defense Transportation's EDI Program: A Security Risk Assessment; PL205LN5; Logistics Management Institute; May 1993; Harold L. Frohman, William R. Ledder.

Managing Business with Electronic Commerce: Issues & Trends; Aryya Gangopadhyay; Idea Group Publishing (2002).

Factors Affecting the Successful Introduction of Mobile Payment Systems; Hans van der Heijden; Vrije Universiteit Amsterdam; 15th Bled Electronic Commerce Conference eReality; Constructing the eEconomy; Bled, Solvenia, Jun. 17-19, 2002.

Do Better Customers Utilize Electronic Distribution Channels? The Case of PC Banking; Dec. 2001; Lorin M. Hitt and Frances X. Frei.

The EBMG Reference Model on Electronic Markets: The Korean Case of JODAL; Eun Kim, Petra Schubert, Dorian Seltz and Bumtae Kim (2007).

PayPal in the Air!—A look at PayPal Mobile; Payment News; Glenbrook Partners; Glenbrook eCommerce Market Analysis Reports (2006).

A Stakeholder Perspective on Successful Electronic Payment Systems Diffusion; Sangjo Oh, Heejin Lee, Sherah Kurnia, Robert B. Johnston, Ben Lim; Department of Information Systems, the University of Melbourne Australia; Proceedings of the 39th Hawaii International Conference on Systems Sciences—2006.

Naval Postgraduate School, Monterey, California; Thesis, Financial Transaction Mechanisms for World Wide Web Applications; John R. Palumbo, Mar. 1996.

Naval Postgraduate School, Monterey, Calinfornia; Thesis, Security Management of Electronic Data Interchange; Hua-Fu Pao; Jun. 1993.

Electronic Payments of Small Amounts; Tobern P. Pedersen; Computer Science Department, Aarhus University (1998).

The Business Revolution through B2B Market Tone and its Impacts over the Financial System gong into 21st Century; Eveline Franco Veloso; The George Washington University; School of Business and Public Management; The Institute of Brazilian Business and Management Issues; XII Minerva Program—Fall 2000.

Households and Technology: The Case of Home Computers—Some Conceptual and Theoretical Issues; Alladi Venkatesh and Nicholas Vitalari, Project NOAH; Center for Research on Information Technology and Organizations (CRITO); originally appeared in M.L. Roberts and L. Wortzel (eds.) Marketing to the Changing Household, Ballinger Publishing, 1985, pp. 187-203.

SEMOPS: Design of a New Payment Service; A. Vilmos and S. Narnouskos; International Workshop on Mobile Commerce Technologies & Applications (MCTA 2003), In proceedings of the 14th International Conference DEXA 2003, Sep. 1-5, 2003, Prague, Czech Republic.

Building a World Class Infrastructure to Support E-Commerce in Malaysia; Raja Mohn Rosli bin Raja Zulkifli; 1997 Telekom Malaysia.

Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].

International Application No. PCT/US2016/042163, International Search Report and Written Opinion dated Sep. 26, 2016.

International Search Report and Written Opinion for PCT/US2016/026000, dated Jul. 13, 2016.

International Search Report and Written Opinion for PCT/US11/33828, dated Jul. 12, 2011, 11 pages.

International Search Report for PCT/US10/36231, dated Nov. 8, 2010, 8 pages.

International Search Report for PCT/US10/36233, dated Jul. 28, 2010, 7 pages.

International Search Report for PCT/US10/36229, dated Jul. 28, 2010, 12 pages.

International Search Report for PCT/US10/35465, dated Jul. 13, 2010, 7 pages.

International Search Report for PCT/US09/48490, dated Jul. 31, 2009, 1 page.

"Greg's diary", Aug. 2009, available at http://www.lemis.com/grog/diary-aug2009.php?dirdate=20090807&imagesizes=11111111111111111113#Photo-19.

Trusted Computing Platform Alliance (TCPA), Main Specification Version 1. 1b, Published by the Trusted Computing Group, 2003, 332 pages.

Benson, Carol Coye, "Faster, Better, Cheaper—Like it or Not," http://paymentsviews.com/2013/03/13/faster-better-cheaper-like-it-or-not/, Mar. 13, 2013.

\* cited by examiner

| Send Money | Transfer Activity | Preferences |

Default Notification Settings

| | |
|---|---|
| Email and/or Mobile device | |
| Telephone number: (949) 555-7878 | |
| E-Mail address: Pat@mail.com | |
| Name on the account: Pat Smith | |

Manage Tokens ✦ Add Email/Mobile Number

| Email/Mobile | Status | Receiving Money | Account No. | Notification | Actions |
|---|---|---|---|---|---|
| (949) 555-7878 | Mobile Unverified | No | Checking XXX-XXX8300 | Default | Verify Mobile \| Edit \| Remove |
| (415) 555-4001 | Mobile Verified | Yes | Account Not Specified | Default | View Details \| Edit \| Remove |
| Ali@gmail.com | Email Verified | Yes | Savings XXX-XXX8301 | Custom | Edit \| Remove |
| (650) 555-5555 | Mobile Inactive | Yes | Savings XXX-XXX8301 | Default | View Details \| Edit \| Remove |

Manage Connections with Other Users

| Name | Nickname | Email/Mobile | Status | Actions |
|---|---|---|---|---|
| Jim Smith | Jimmy | (415) 222-2222 | Established | Send Money \| Edit \| Remove |
| Pat Jones | Mom | (415) 555-5555 | Not Established | View Details \| Send Money \| Edit \| Remove |
| Zani Smith | | zanis@mail.com | Not Established | View Details \| Send Money \| Edit \| Remove |

✦ Add Recipient

Fig. 4

Send Money

| | |
|---|---|
| To | Select a recipient ▼ |
| From Account | Choose account ▼ |
| Amount ($xxxxx limit) | $ |
| Description (Recommended) | |
| From (Your name) | Pat Smith |
| Nickname (Optional) | Recommended if your recipient knows you by another name. |

Add Recipient | Manage Recipients

Notification Preferences
We will contact you at
wincubator1@gmail.com
pooja.mangla@wellsfargo.com
222-444-5555
Edit

[Continue]

Payment Channels
Choose your method of payment

Method
☐ Credit Card network (Visa, American Express, Mastercard)
☒ ACH
☐ PayPal

| | Funds available to recipient | Fee |
|---|---|---|
| | 2 days | $5.00 |
| | 4 days | $0.00 |
| | 4 days | Fees charged by PayPal |

Recent Transfers Sent

▲ (4) new transactions returned since last session. View More Transfers

| Date Sent | From Account | Recipient | Amount | Description | Status | Actions |
|---|---|---|---|---|---|---|
| 12/09/2009 | Checking XXX-XXX8300 | Frank Costanza (JR) | $121.00 | Trip | Pending | View Details |
| 11/25/2009 | Checking XXX-XXX8300 | Frank Costanza (JR) | $25.00 | Lunch | Returned | View Details |
| 11/09/2009 | Savings XXX-XXX8301 | Ali Tahbaz | $50.00 | Movies | Complete | |

Fig. 6

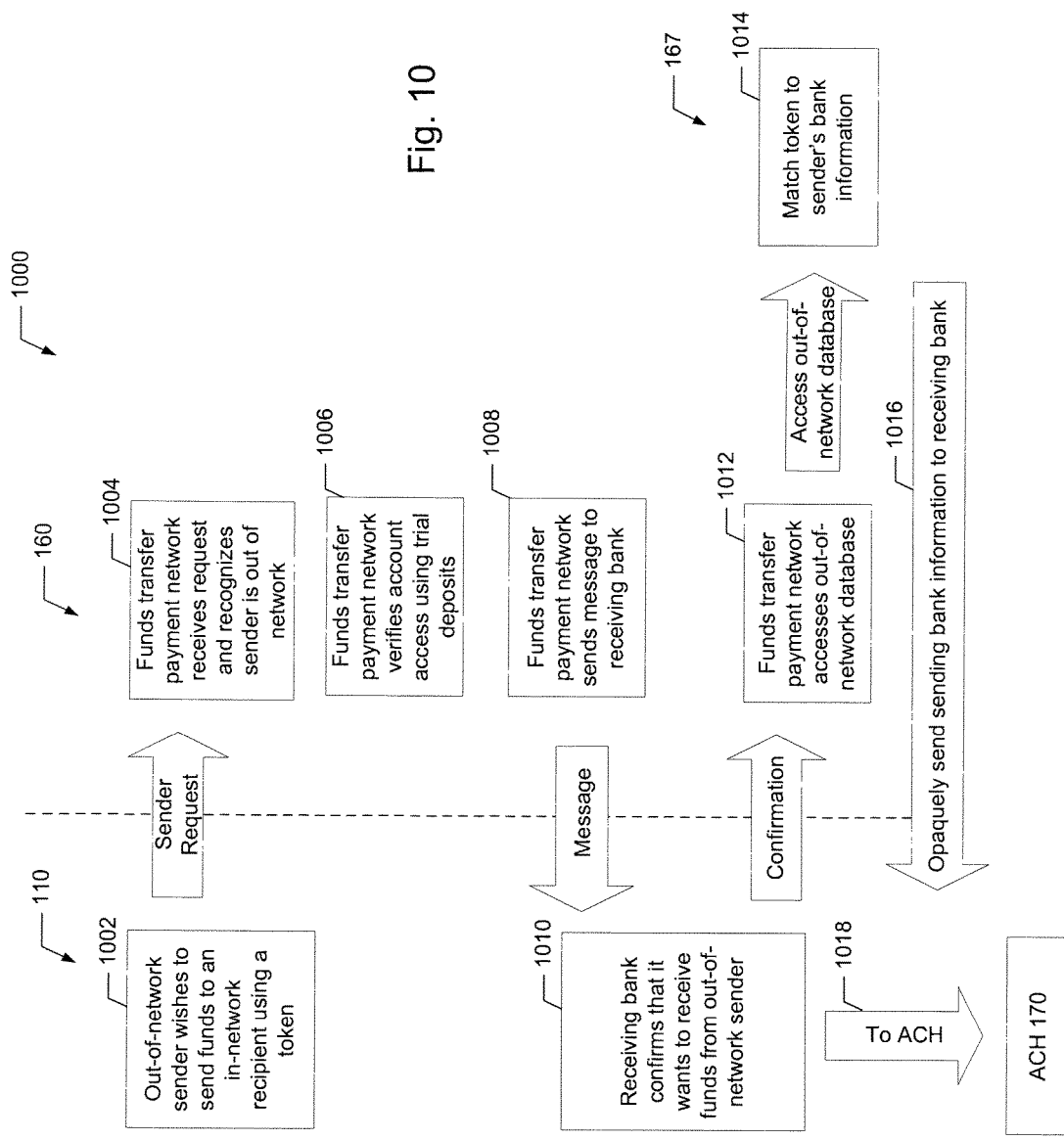

SYSTEM AND METHOD FOR TRANSFERRING FUNDS

PRIORITY CLAIM

This application claims priority to U.S. Patent Application Ser. No. 61/607,882, entitled "SYSTEM AND METHOD FOR TRANSFERRING FUNDS," filed Mar. 7, 2012, and U.S. Patent Application Ser. No. 61/657,339, entitled "SYSTEM AND METHOD FOR TRANSFERRING FUNDS," filed Jun. 8, 2012.

BACKGROUND

Embodiments of the present invention relate generally to the field of transferring funds. In particular, they relate to systems and methods for generating and maintaining a payment network.

Payments made between individuals are often made with cash or checks. Payments for items and services purchased from businesses are often also made with cash or checks, and are also often made using credit cards or debit cards. While these payment mechanisms have worked well, enhanced systems and methods of facilitating such payments would be desirable.

SUMMARY

According to an example embodiment, a computer-implemented payment processing method comprises receiving a fund transfer request identifying a recipient by a public identifier, determining a private identifier for the receiver based on the public identifier, and transmitting a transfer message via a computer network to cause funds to be transferred from a sender to the recipient. The fund transfer request is received via a computer network. The message is generated using the private identifier.

According to another example embodiment, a computer-implemented payment processing system comprises an account information directory and a rules engine. The account information directory comprises a database of registered users. At least one of the registered users is associated with a plurality of public tokens that are stored in the account information directory. The plurality of tokens are useable by the user to send funds to other users and to receive funds from the other users. The rules engine is accessible to the user by way of a computer network to configure attributes of the plurality of public tokens.

BRIEF DESCRIPTION OF THE DRAWINGS

FIG. 4 is a screen shot of a web page that may be presented to a user to configure user preferences and manage connections with other users.

FIG. 6 is a screen shot of a web page that may be presented to a user to send money to a recipient.

FIG. 10 is a flow diagram illustrating an example process for facilitating transfer of funds from an out-of-network sender to an in-network recipient according to an example embodiment.

DETAILED DESCRIPTION

Figure 1:
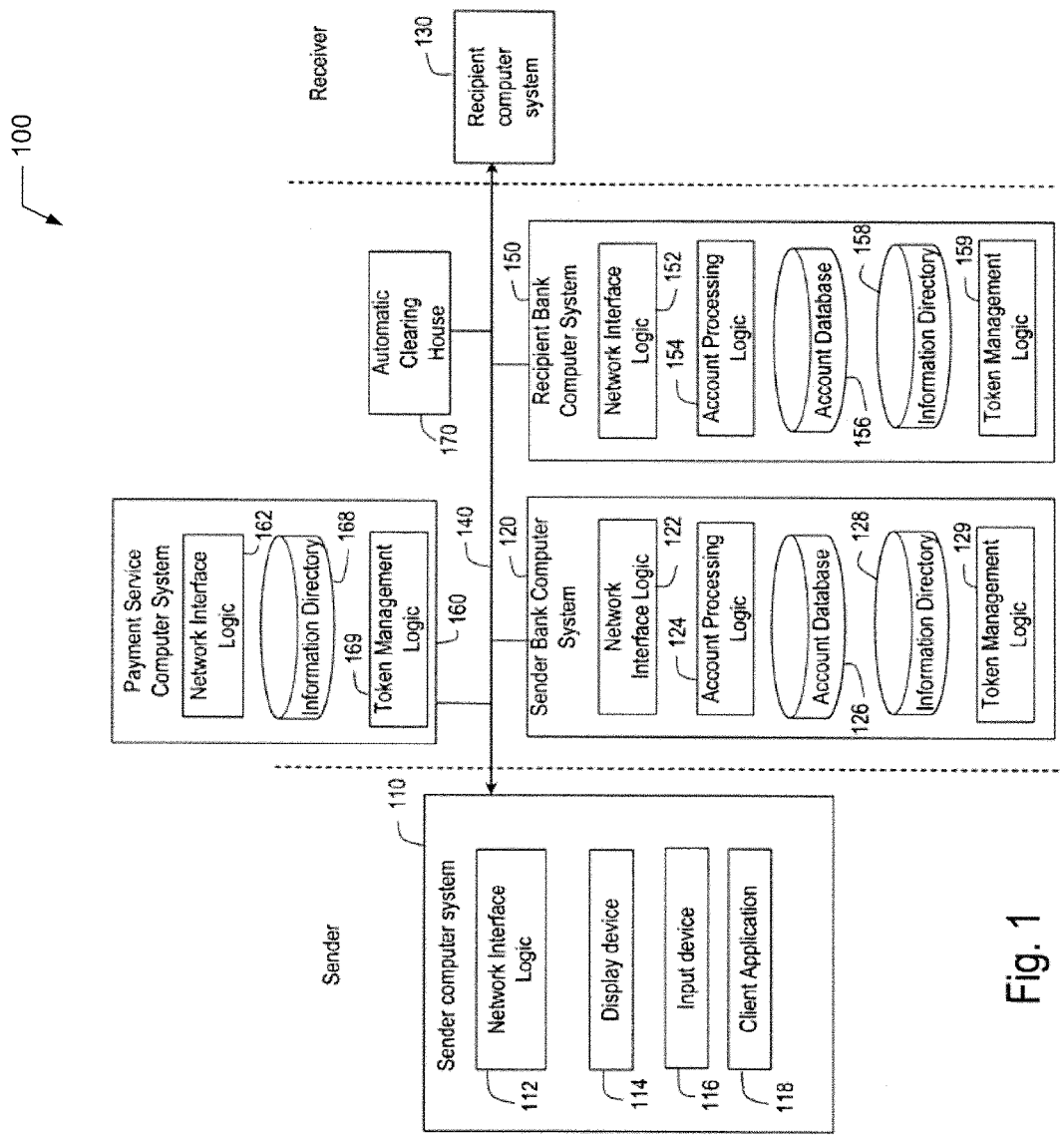
FIG. 1 is a schematic diagram of a funds transfer system in which a sender and a recipient use different banking institutions according to an example embodiment.

Referring to FIG. 1, a funds transfer system 100 that implements a payment network, or a "funds transfer payment network," is shown. The funds transfer system 100 may be utilized by senders to send funds to recipients and by recipients to receive the funds. The funds transfer system 100 may facilitate the transfer of funds from senders to receivers without either party disclosing any financial account information to each other. The senders and recipients may be individuals or business entities. In the example embodiment, the sender uses a bank account as the source of funds. In other embodiments, the sender may use credit cards, debit cards, business credit cards or check cards as the source of funds. The funds transfer system 100 may be used for both intrabank transfers (i.e., transfers in which the sender and the recipient both have accounts at the same bank and the funds are transferred between the accounts within the same bank) and interbank transfers (i.e., transfers in which the sender and the recipient have accounts at different banks and the funds are transferred between the accounts at different banks).

The funds transfer system 100 may include, among other systems, a sender computer system 110, a bank computer system 120, a recipient computer system 130, a bank computer system 150, a payment service computer system 160, and an automated clearing house computer system 170. Each of the above described systems may communicate through a network 140, which may include one or more of the Internet, Cellular network, Wi-Fi, Wi-Max, a proprietary banking network, and so on. In FIG. 1 and throughout the remaining description, for sake of providing an example, it is assumed that the sender performs a funds transfer from an account maintained by the bank computer system 120 and the receiver receives the funds using an account maintained by the bank computer system 150. Hence, the computer system 120 is sometimes referred to herein as the sender bank computer system and the computer system 150 is sometimes referred to herein as the receiver bank computer system. It will be appreciated of course that any given bank computer system may operate in different capacities in the context of different fund transfer transactions. Additionally, while the examples provided herein are primarily in the context of a sender requesting a funds transfer to a recipient, it will also be appreciated that a recipient may request a funds transfer from a sender.

The sender computer system 110 may be used by an individual user (e.g., a business owner or employee, a consumer, and so on) to create transactions and interact with banking functions provided through an online banking area of a website provided by the sender bank computer system 120 or through a website provided by a payment service 160. The sender computer system 110 may, for example, comprise a user computer (e.g., desktop or laptop computer), a cellular telephone, smart phone, a mobile handheld wireless e-mail device, a personal digital assistant, a portable gaming device, or other suitable device. The sender computer system 110 may also comprise one or more servers each with one or more processors configured to execute instructions stored in memory. For example, such an arrangement may be utilized if the sender is a merchant or other business.

The sender computer system 110 may comprise network interface logic 112, a display device 114, an input device 116, and client application 118. Network interface logic 112 may include, for example, program logic that connects the sender computer system 110 to the network 140. As described in greater detail below, for example, the sender computer system 110 may receive and display screens on the display device 114 including account information, transaction instructions, and so on. In an example embodiment, such screens may be used to request a username and password information. Such screens may also be used to prompt the user to provide information regarding the amount of the funds and the identity of the merchant or individual that is to receive the funds. Such information may comprise, for example, a name, an address, a phone number, an e-mail address, a selection of a recipient from an electronic directory, and/or other information. Such screens may also include screens displaying information regarding past transactions. Such screens are presented to the user via the display device 114. The input device 116 may be used to permit the user to initiate account access and to facilitate receiving fund transfer request information from the user.

The client application 118 may comprise program logic (i.e., stored executable instructions) configured to implement at least some of the functions described herein. As will be appreciated, the level of functionality that resides on the sender computer system 110 as compared to other components of the funds transfer system 100 may vary depending on the implementation. The client application 118 may simply be a web browser (e.g., Internet Explorer®, Mozilla Firefox®, Chrome®, Safari®, and so on) configured to receive and display web pages received from the banking computer system 120. The client application may also comprise a mobile web browser, text message (SMS) interface, a dedicated application, or other program suitable for sending and receiving information over the network 140.

The bank computer system 120 is operated by a bank institution that maintains accounts held by customers, such as demand deposit accounts, credit card accounts, home mortgage loans, student loans, and so on. The bank computer system 120 may, for example, comprise one or more servers each with one or more processors configured to execute instructions stored in memory, send and receive data stored in memory, and perform other operations to implement the operations described herein associated with logic or processes shown in FIGS. 1-7.

The bank computer system 120 may include network interface logic 122, account processing logic 124, an account database 126, and an information directory 128. The network interface logic 122 may include, for example, program logic that connects the bank computer system 120 to the network 140. The network interface logic 122 may facilitate secure communications between the bank and the sender and/or the recipient. The network interface logic 122 may also facilitate communication with other entities, such as other banks, settlement systems, and so on. The network interface logic 122 may include user interface program logic configured to generate and present web pages to users accessing the bank computer system 120 over the network 140.

The account processing logic 124 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a sender or recipient of funds), the account processing logic 124 reflects an appropriate debit or credit in the account database 126, which stores account information (e.g., transactions, information about the account holder, and so on) for accounts that are maintained by the bank on behalf of its customers. The account processing logic 124 may also process fund transfer requests to transfer funds from a sender using the sender computer system 110 to a recipient using the recipient computer system 130.

The information directory 128 may be used when an identifier other than a bank account/routing number is used (e.g. an e-mail address, phone number, Universal Payment Identification Code (UPIC), randomly generated number, and so on) to identify a recipient of a funds transfer. The information directory 128 may be a database that is maintained to allow the financial institution to convert/correlate the recipient's cell phone number (or e-mail address, or other identifier) to a bank account number/routing number of the recipient's bank account. This arrangement allows the sender to uniquely identify the recipient (e.g., with an e-mail address or other identifier), without necessarily having private/personal information regarding the recipient (i.e., the recipient's bank account/routing number).

Users may register their information with the information directory 128 prior to any financial transaction. A user may be added to the information directory 128 upon registering for the funds transfer system 100 through the bank computer system 120. Upon registration, a new entry may be created for the newly registered user in a database that implements the information directory 128. The user may provide one or more identifiers (e.g., phone numbers, e-mail addresses, and so on) that the user may share with other individuals with whom the user interacts (for example, in the same way that people selectively or freely share phone numbers and e-mail addresses with other individuals for purposes of communicating with such other individuals). Herein, such identifiers are referred to as "public identifiers" or "public tokens." (The terms "identifier" and "token" are used interchangeably herein to refer to a code (e.g., an e-mail address, a phone number, a user generated or system generated character string, etc.) that identifies a user.) The information directory 128 may also generate or otherwise associate an identifier that is securely maintained and that is used to identify the user in the information directory 128. Herein, such identifiers are referred to as "private identifiers." The private identifier may, for example, be a unique ID of the database entry for the user in the information directory 128. While the private identifier is known by the information directory 128, it need not be known by the user with whom it is associated or by other users. However, it may be known by banks and other entities that are members of the funds transfer payment network. In addition to the public identifier(s) (e.g., phone numbers, e-mail addresses, and so on), the private identifier (e.g., database UID), other information may also be stored in the database entry, such as account information (account numbers, routing numbers, etc.) for accounts held by the user at the bank and user preferences. At least some of this information may be populated automatically, e.g., if the user registers for the funds transfer system 100 during a secure on line banking session on the bank computer system 120.

Additionally, the database entry for each user may also store a registry of other users connected to that user. That is, for each user, a registry may be stored that includes a listing of each other user with whom the user has an established connection. Such connection may be established, for example, the first time that the user sends or receives funds from the other user. A connection may also be established by way of a user interface that permits a user to add connections with other users through a lookup service in the information directory 128 and/or another information directory. An example of such a user interface is discussed below in connection with FIG. 4. The users may include not only users that are registered in the funds transfer payment network, but also other affiliated payment networks, as discussed in greater detail below. For each user in the registry, additional information may be stored, such as their unique ID and/or other information. As another example, the information for the other users may be stored in separate database entries in the information directory 128.

In various embodiments, a plurality of information directories may exist, each directory maintained by a different institution or entity. For example, users that maintain accounts at the bank associated with bank computer system 120 may register through bank computer system 120, users that maintain accounts at the bank associated with bank computer system 150 may register through bank computer system 150, and so on for other users that maintain accounts at other entities. Such entities may also include non-bank entities (e.g., payment processing companies, credit agencies, credit card network providers, and so on), and users may also register through such non-bank entities.

In addition to the public and private identifiers that have already been described herein, additional identifiers may also be used. For example, such additional identifiers may be handled with varying levels of security. As another example, variations of existing public identifiers may be used to implement special purpose public tokens, public tokens with customized functionality, and so on, as discussed in greater detail below.

The token management logic 129 manages tokens. For example, the token management logic 129 may be configured to register tokens, authenticate tokens, generate tokens and so on. The token management logic 129 may also facilitate identification of the recipient when a token is not recognized. The token management logic 129 may also be used to customize attributes of tokens, such that particular accounts are used, particular methods of notification are used, and so on. The token management logic 129 is discussed in greater detail below in connection with FIG. 2.

The recipient computer system 130 may be configured in generally the same manner as the other computer systems described herein. For example, if the fund recipient is an individual, the computer system 130 may be a mobile device, such as a cellular phone, smart phone, mobile handheld wireless e-mail device, personal digital assistant, portable gaming device, a desktop computer or other suitable device. The computer system 130 may also comprise one or more servers each with one or more processors configured to execute instructions stored in memory. For example, such an arrangement may be utilized if the recipient is a merchant or other business.

In one embodiment (e.g., where the recipient is a bricks-and-mortar merchant), the recipient computer system 130 may include point of sale devices (e.g., cash register systems) that are equipped to electronically obtain public token information from customers. For example, the cash register systems may be equipped with a near field communication (NFC) reader device that is capable of reading a public token (e.g., cell phone number) from an NFC equipped cell phone. As another example, the cell phone may include an application that is configured to generate a bar code or other image on a display screen that contains the public token, and the cash register system may be equipped with a bar code reader configured to read the bar code. The recipient computer system 130 may then request payment from the sender via the funds transfer system 100 using the public token obtained at the point of sale.

The recipient bank computer system 150 may be configured in a similar manner as the sender bank computer system 120. Thus, the bank computer system 150 comprises network interface logic 152, account processing logic 154, account database 156, and information directory 158 corresponding to the network interface logic 122, account processing logic 124, account database 126 and information directory 128 of the bank computer system 120.

The payment service computer system 160 may be associated with a payment service that is configured to facilitate interbank fund transfers, e.g., a payment service provided by a non-bank entity as previously mentioned. The payment service may, for example, be an entity that is formed as a joint venture between banks and/or other entities that send and receive funds using the funds transfer system 100. As another example, the payment service may be a third party vendor. As another example, the payment service may be a web portal provided for an online community of individuals where such individuals obtain user names/login IDs or otherwise become registered members. The individuals may, for example, use the web portal to interact with each other and/or to interact with a service provided by the online community. Examples of online communities include MSN®, iPhone® users, Facebook®, LinkedIn®, and so on. The payment service may, for example, be an additional service that is offered by the web portal to the members of the online community. As another example, the payment service may be provided by one of the banks, i.e., such that the bank performs both the operations described herein as being performed by the bank computer system 120/150 and the operations described herein as being performed by the payment service computer system 160.

Herein, the banks associated with computer systems 120 and 150 are assumed to be "member banks." That is, the banks associated with computer systems 120 and 150 are assumed to follow established protocols for transferring funds using the funds transfer system 100. For example, in the context of a payment service that is created as a joint venture, the member banks may include at least the banks that are part owners of the joint venture, as well as potentially other banks. While two member banks are shown in FIG. 1, it will be appreciated that there may be additional member banks. Additionally, as previously indicated, non-bank entities may also be members. The payment service may also be used by senders and recipients that have bank accounts at non-member banks, for example, by permitting such users to register directly with the payment service computer system 160. Hence, users do not need to be customers of any particular bank in order to be able to use the funds transfer system 100.

The payment service computer system 160 may, for example, comprise one or more servers each with one or more processors configured to execute instructions stored in memory, send and receive data stored in memory, and perform other operations to implement the operations described herein associated with logic or processes shown in FIGS. 1-6. The payment service computer system 160 includes network interface logic 162 and an information directory 168. Although not specifically shown, it will be appreciated that the payment service computer system 160 may include account processing logic and an account database in the same or similar manner to the account processing logic 124, 155 and the account databases 126, 156. The network interface logic 162 may include user interface program logic configured to generate and present web pages to users accessing the payment service computer system 160 over the network 140.

The information directory 168 may be used when an identifier other than a bank account/routing number is used (e.g. an e-mail address, phone number, Universal Payment Identification Code (UPIC), randomly generated number, and so on). As described above in connection with the information directory 128 and 158, the information directory 168 is a database that is maintained to allow the payment service to convert/correlate the recipient's cell phone number (or e-mail address, or other token) to a bank account number/routing number of the recipient's bank account for users that registered through the payment computer service system 160. This arrangement allows the sender to uniquely identify the recipient (e.g., with an e-mail address or other identifier), without necessarily having private/personal information regarding the recipient (i.e., the recipient's bank account/routing number).

Users including senders and recipients may register their information with the information directory 168 in advance, e.g., where such users do not bank or have accounts with any of the other member entities. Additionally, the payment service computer system 160 may be configured such that users that only wish to send funds may do so without registering. For example, the payment service computer service system 160 may be configured to generate web pages that receive credit card information from a sender to complete a transaction each time a sender wishes to send funds, without requiring that the sender ever register with the payment service computer service system 160.

As will be appreciated, the information that is stored in the information directory 168 may vary depending on the implementation, including the extent to which information is also stored in the information directories 128 and 158. For example, in one embodiment, when a user registers at the bank computer system 120 (or at the bank computer system 150, or at the computer system of another member entity), information may be stored in both the information directory 128 and the information directory 158. The information directory 128 may store a complete identification of the user's bank accounts and other information collected during registration. Conversely, the information directory 168 may store a reduced amount of information, such as the registered public token(s), the financial institution with it is associated, and the private token (e.g., unique ID) associated with each token. More detailed bank account number/routing number, or other sensitive information need not be stored at the information directory 168. In another embodiment, instead of using a payment service computer system 160 to maintain the information directory 168, such information may be stored entirely in the information directories 128, 158 maintained by individual member banks. As will also be appreciated, the extent to which transaction details are tracked and maintained in the account processing logic 124, 154 as compared to the extent to which transaction details are tracked and maintained by the payment service computer system 160 may vary depending on the implementation.

The Automatic Clearing House (ACH) system 170 is used to transmit funds to and from bank accounts of the senders and recipients. As is known, the ACH Network is a nationwide batch oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Figure 2:
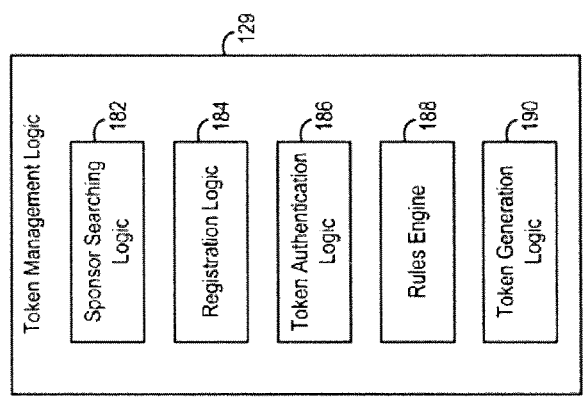
FIG. 2 is a schematic diagram of token management logic that may manage tokens for fund transfer requests according to an example embodiment.

Referring to FIG. 2, FIG. 2 shows the token management logic 169 in greater detail. As shown in FIG. 2, the token management logic 169 includes sponsor identification or sponsor searching logic 182, registration logic 184, token authentication logic 186, rules engine 188, and token generation logic 190. Although the token management logic 169 is shown, it will be appreciated that the token management logic 129 and 159 may be configured in the same or similar manner.

The sponsor identification logic 182 may be configured to identify a sponsor of a token. For example, if the sender uses a token to identify a recipient that is unrecognized at the information directory 128 of the sender bank computer system 120 (i.e., because the recipient is not a customer of the sender bank), the sponsor identification logic 182 may be configured to receive the token from the sender bank computer system 120 and access the information directory 168 to provide an identification of the unique ID and financial institution associated with that token.

As will be appreciated, the extent to which the bank computer systems 120, 150 have sponsor identification logic that operates in the same manner as the sponsor identification logic 182 may depend, in part, on the extent to which the information is stored in the information directory 168 as compared to the extent to which information is also stored in the information directories 128 and 158. In various embodiments, greater or lesser degrees of reliance may be placed on the information directory 168 to perform user identification functions in a centralized fashion in connection with the transfer of funds between entities. Herein, for sake providing an example, it is assumed that the information directory 168 is used to perform user identification functions in a centralized fashion in connection with the transfer of funds between entities. In such embodiments, it may be possible to avoid replicating all the functions of the sponsor identification logic 182 and the bank computer systems 120, 150.

In one embodiment, the funds transfer payment network is configured to interact with other affiliated payment networks (e.g., PayPal, CashEdge, and so on). In such an arrangement, if the token provided by the sender bank computer system 120 is not recognized in the information directory 168, the sponsor identification logic 182 is configured to transmit inquiries to the other affiliated payment networks (e.g., in a predetermined sequence) to determine if the token is recognized at any of the other affiliated payment networks. If the recipient is registered with another payment network, then the funds may be transferred to the recipient by routing the funds through the other payment network. In an embodiment where a user lookup service is provided by the information directory 168, the look up service may operate in the same manner to identify users registered at remote entities. Information may also be stored in the information directory 168 identifying the payment network determined to be associated with that token, thereby facilitating additional funds transfers to that token in the future. Hence, in such an arrangement, funds may be pushed to a recipient that is not registered with the funds transfer payment network but rather that is registered with another payment system. Additionally, such funds may be pushed to the recipient without the sender having to know or be concerned about whether the recipient is registered with the funds transfer payment network.

The registration logic 184 is configured to facilitate the process of registering new users. For example, in the preceding discussion, if the token is not recognized at the information directory 168, and is not registered at any other affiliated payment network, then the registration logic may be configured to send the recipient an e-mail or other communication inviting the recipient to register with the payment network. Such an e-mail may include a link to the website provided by the payment service computer system 160. The registration logic 184 may be configured to generate web pages for presentation to the user at the website to facilitate the registration process. If, based on information provided by the user when registering at the website, it is determined that the user is a customer of one of the member entities, then the user may be forwarded to the website of the member entity to complete the registration process. As will be appreciated, the registration logic 184 may also present web pages to the user in other scenarios (e.g., where the user has arrived at the website as a result of a search engine query, where the user has arrived at the website via another website (e.g., such as an online community website or merchant website), and so on). The registration logic 184 may create new database entries in the information directory 168 responsive to inputs received from the user.

The token authentication logic 186 is configured to authenticate tokens. For example, when a user registers a new token, the token authentication logic 186 may be configured to confirm that the user is associated with that token (e.g., that the user who is attempting to register a cell phone number as a token is indeed the owner of that cell phone number). (Herein, the term "own" in the context of telephone numbers refers to the telephone number being assigned to one particular user as opposed to being assigned to other users, and is not being used to refer to ownership as between the user and the phone carrier that provides the telephone number to the user. The term is used analogously in the context of e-mail addresses.) As another example, when a user attempts to register a new e-mail address, the authentication logic 186 may perform an authentication operation such as sending the user an e-mail at the new e-mail address. The e-mail may, for example, contain a link that must be accessed by the user in order to successfully complete the registration process.

Additionally, the token authentication logic 186 may be configured to perform authentication operations on previously-registered tokens. For example, a user that registers a cell phone number may ultimately switch cell phone numbers and/or cell phone carriers. The token authentication logic 186 may be configured to process disconnect directories that are published by cell phone carriers and that list cell phone numbers that have been disconnected by that carrier. For example, if a registered cell phone number is listed as having been disconnected, the token authentication logic 186 may send an e-mail to the user at a registered e-mail address to determine whether the cell phone number is no longer a valid token for that user or whether the user has merely changed cell phone carriers but has retained the cell phone number.

The token authentication logic 186 may also be configured to send follow up communications to the user trying to use a token to send/receive money from another user if there is uncertainty regarding whether the other user is correct owner of the token. For example, the token authentication logic 186 may be configured to notify the sender that such uncertainty exists, request that the sender provide confirm information that was provided regarding the recipient, provide additional information regarding the recipient, and so on. For example, if a user attempts to send funds using the token jsmith@abc-company.com, an e-mail may be sent to the user if there is uncertainty whether ownership of the token jsmith@abc-company.com has changed (e.g., due to a change in employees at ABC Company). The authentication logic 186 may also be configured to access other networks or online communities (e.g., Facebook, LinkedIn, etc.) to obtain additional information that may be used to authenticate the token. The token authentication logic 186 may also be configured to track the changing public tokens by date and time of use and the date and time that a particular recipient ceases to use a particular public token.

Hence, the registration logic 182 and the authentication logic 184 cooperate to facilitate the registration of tokens and to ensure that the tokens are associated with their correct owners. In one embodiment, the entity that registers a token is responsible for warranting the validity of the registration. For example, if the recipient bank registers a token 415-555-1234, and subsequently accepts a payment to the user that registered the token 415-555-1234, then the recipient bank is responsible for refunding money to the sender if the user that registered the token 415-555-1234 is not actually the owner of that cell phone number at the time of the funds transfer (e.g., because the previous owner changed cell phone numbers, and the new owner is on a different payment network). Hence, the recipient bank undertakes responsibility for correctly authenticating the user at the time of registration and for routinely processing disconnect directories to ensure that the authentication remains valid.

In one embodiment, the warranty (and/or limited access to the information directory 168) may be provided as a service to third parties. For example, an on line retailer that is refunding money to a customer may wish to verify that a token previously provided by the customer (e.g., "415-555-1234") remains accurate. If funds are refunded to the customer at the "415-555-1234" token, but the customer no longer owns that token, then the payment service would be responsible for refunding the funds to the correct customer. The fee charged for the service may, for example, be based on the dollar value of liability accepted by the payment service for providing incorrect information. As another example, a service may be provided in which a per token fee is charged for identifying a user based on a token and/or for identifying a token (e.g., e-mail address, cell phone number, etc.) based on an identification of a user.

The rules engine 188 is configured to permit users to configure different attributes for different tokens. The attributes may be specified in rules that are configured based on user specified preferences. In various embodiments, the rules engine 188 may provide a user with default settings that are used until the user decides to customize the rules. For example, the rules engine 188 may be used to configure the manner in which funds are directed to various accounts held by the user at the bank (e.g., to forward at least a portion of the funds or transfer funds into a particular type of account), and so on. As another example, the funds may be split between a plurality of accounts according to the rules specified by the user, e.g., the funds may also be transferred into at least one of a retirement account, savings account, PayPal® account, or a certificate of deposit. As another example, portion of the received funds may be forwarded to a different user that is registered with the payment network. As another example, the rules engine 188 may be used to configure the manner in which a notification is sent to a recipient informing the recipient that a fund transfer request has been made by a sender. For example, according to one embodiment, the rules may be configured to specify the channel(s) by which notifications are sent (e-mail, text message, voicemail, and so on), the e-mail account(s) and/or phone number(s) to which notifications are sent, and so on. As another example, if the fund transfer amount is greater than a threshold value, the user may receive an automated telephone call instead of an e-mail message or may receive an e-mail/telephone call instead of no message. As another example, if the fund transfer request originated from a particular sender, then the user may specify the mode of the notification (e.g., e-mail, voicemail, or text message). As another example, the rules engine 188 may be used to configure the payment channel used to send funds to a recipient (e.g., ACH transfer, credit card network, PayPal network, printed and mailed check, and so on). As another example, the rules engine 188 may be used to configure the speed with which funds are transferred to the recipient (e.g., instantaneous, same day, overnight, 2-day payment, and so on). As another example, the rules engine 188 may be used to configure transaction limits (e.g., to ensure that no more than $500 can be charged to a particular token during a predetermined time period such as one day, one week, one month, etc.).

The token generation logic 190 may be configured to generate additional public tokens for a user. The token generation logic 190 may cooperate with the rules engine 188 to create different tokens that are configured with different attributes. For example, a business may wish to use different individual tokens depending on whom within the business is responsible for processing a particular transaction. For example, a recipient that is a landlord that owns several apartment buildings may wish to create different tokens for each apartment building. For example, the additional tokens may be based on user provided alphanumeric character strings, may be system generated based on pseudo random character strings, or may be generated in another fashion. For example, if the landlord recipient already uses an e-mail address as a public token (e.g., landlord@mail.com), the additional public tokens may be variants of the public token already used by the recipient (e.g., landlord@mail.com/building1, landlord@mail.com/building2, landlord@mail.com/building3 and so on). Such tokens may then be configured with different attributes using rules engine 188. For example, if each of the different buildings has a different building manager, then an e-mail may be sent to an e-mail address of the respective building manager for a particular apartment building when a tenant of that apartment building pays rent.

As another example, the landlord recipient may provide each tenant with a different public token for use by the tenants to pay rent. Again, for example, the additional tokens may be variants of the public token already used by the recipient (e.g., landlord@mail.com/unit101, landlord@mail.com/unit102, landlord@mail.com/unit103 and so on). The bank computer system 150 may then receive funds from each tenant and all the funds may be transferred to one or more accounts belonging to the landlord. The account processing logic 154 may be configured to generate a report showing the funds received in connection with each token (thereby showing, for example, which tenants have paid in a given month and which tenants have not paid in a given month). Tokens may also be programmed with additional information, for example, the amount of the expected monthly payment. The account processing logic 154 may then be configured to compare the amount actually received with the expected monthly payment to ensure that the tenant has paid completely and to track overall account status of the tenant.

As another example, a recipient may also configure single use tokens. For example, a recipient may be organizing an event in which other users are expected to financially contribute to the event. The recipient may then configure a token (e.g., johnsmith@mail.com/moms-birthday-party) which may be provided to the other users. The account processing logic 154 may then generate a report showing the funds that have been received from various ones of the other users in connection with that token.

As another example, senders may also configure different tokens. For example, a sender may use a first token as their default token (e.g., johnsmith@mail.com), and create additional special purpose tokens where payment is to be made from other accounts (e.g., johnsmith@mail.com/collegesavings to make a tuition payment from a college savings fund).

As another example, as previously indicated, the information directories 128, 158, 168 may provide a lookup service that may be used by users to establish connections with other users. In such an embodiment, users may be able to configure aspects of their tokens that are displayed to other users. For example, if an individual is operating a business under another name (e.g., Joseph Smith DBA "Joe's Lawn Service"), it may be desirable to permit the user to configure the token such that the business name is displayed to other users, even though the name on the account is actually the individual's name. In this manner, it may be easier for customers of the business to establish a connection with the business.

Figure 3A:
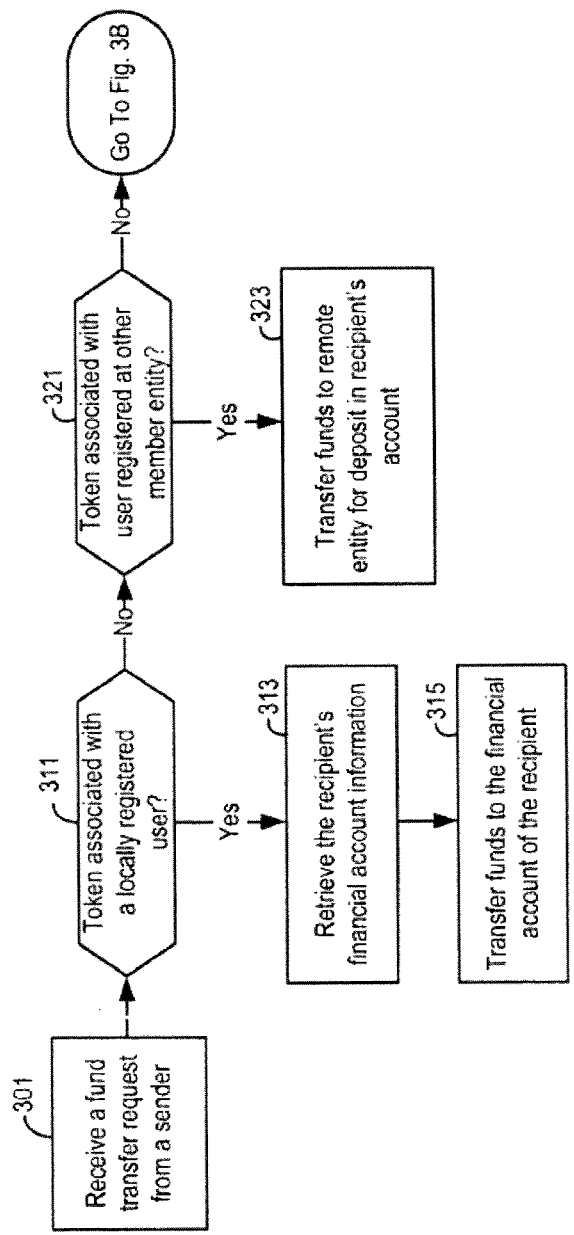
FIG. 3A is a process in which a fund transfer request results in the funds being received by a registered or unregistered recipient according to an example embodiment.
Figure 3B:
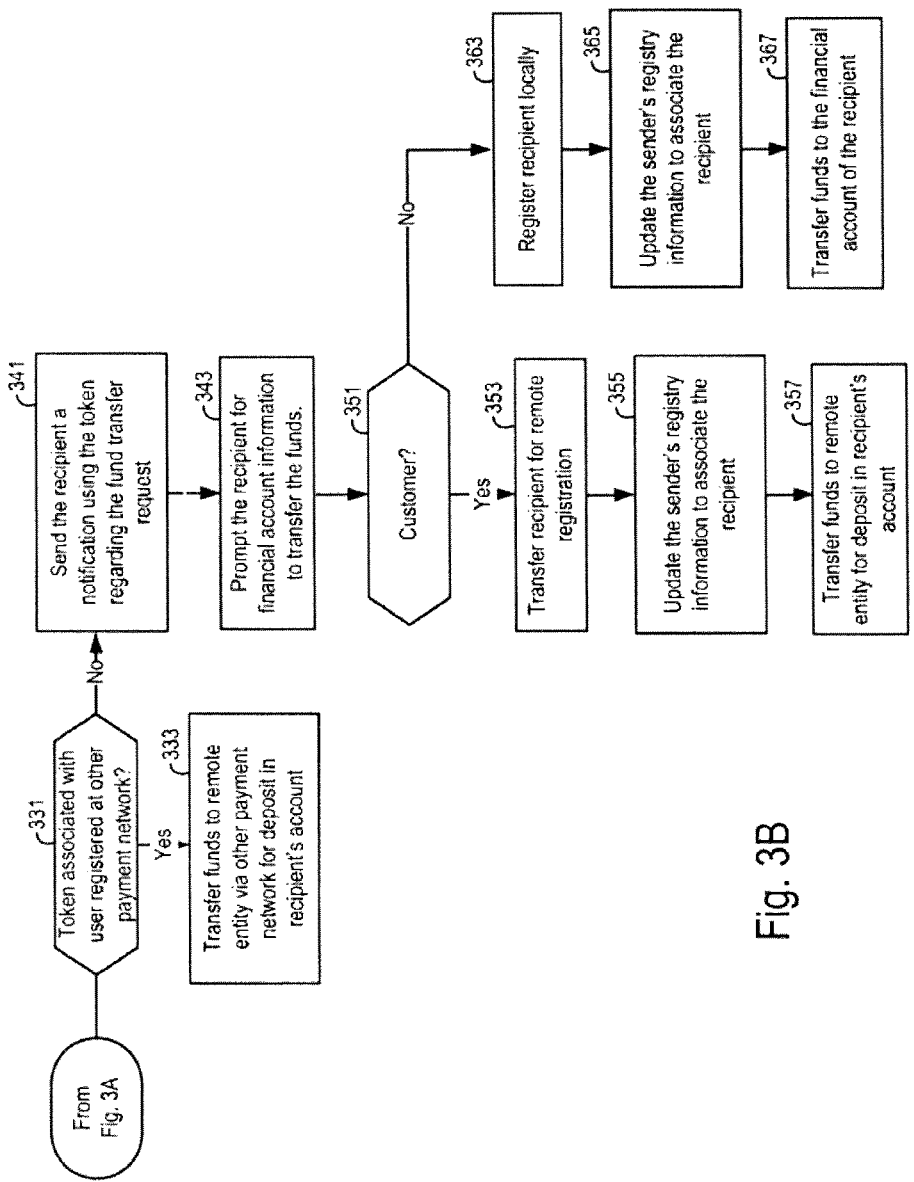
FIG. 3B is a process in which a fund transfer request results in the funds being received by a registered or unregistered recipient according to an example embodiment.

Referring to FIGS. 3A and 3B, FIGS. 3A and 3B illustrate a process in which the funds may be received by a registered or unregistered recipient according to an example embodiment. In FIGS. 3A and 3B, a fund transfer message is received from a sender at the sender bank computer system 120 and propagates to the recipient bank computer system, where it causes funds to be deposited in to the account of a recipient. Specifically, at step 301 in FIG. 3A, the sender bank computer system 120 receives a fund transfer request from a sender which identifies the recipient using a token. At step 311, the bank computer system 120 searches the information directory 128 to determine whether the token is associated with a user that is registered with the sender bank (i.e., a transfer within the same bank). If the token is associated with a user registered with the sender bank then, at step 313, the recipient's account information is retrieved from the information directory 128. Subsequently, at step 315, the funds are transferred to the recipient's account. The funds may be transferred to the recipient's financial account based on preferences of the sender and the recipient, as discussed in greater detail below in connection with FIGS. 4 to 6.

If, at step 311, the recipient is not registered with the sender bank, then the process proceeds to step 321. At step 321, the bank computer system 120 transmits an inquiry to the payment service computer system 160, and it is determined if the token is associated with a user that is registered at another member entity of the funds transfer payment network. For example, if it is the first time that the sender has transferred funds to this particular recipient, then the bank computer system 120 may transfer the public token of the recipient as provided by the sender. In this scenario, the sponsor identification logic 182 may perform a search of the information directory 168 to determine if the token is associated with a user that is registered with another member entity. If the public token is located in the directory, then the payment service computer system 160 may return the unique ID associated with the public token along with an identification of the financial institution or other member entity with which it is associated to the sender bank computer system 120. The sender bank computer system 120 may then create another registry entry for the sender, and store the public token and the unique 1D of the recipient as part of the registry entry. The sender bank computer system 120 may also prompt the sender to provide other information about the recipient (e.g., a nickname or other name by which the sender wishes to identify the recipient).

As another example, if the sender has transferred funds to this recipient previously, then the bank computer system 120 may transfer the unique ID of the recipient to the payment service computer system 160. In this scenario, the sponsor identification logic 182 may use the unique ID as an index to the database that implements the information directory 168 to locate the recipient in the information directory 168. Assuming the unique ID is still valid and is still located in the information directory 168, then the payment service computer system 160 may return the financial institution or other member entity with which it is associated to the sender bank computer system 120. As another example, if the sender has transferred funds to this recipient previously, then the bank computer system 120 identifies the member entity with which it is associated based on the unique ID itself (e.g., where the unique ID is embedded with information that identifies the financial institution). At step 323, the sender's registry is updated to include an entry for the recipient, including the unique identifier of the recipient. At step, 325 the funds are transferred to the member entity (e.g., the recipient bank in the example of FIG. 1) for deposit along with the unique ID of the recipient. Based on the unique ID, the information directory 158 may be accessed by the recipient bank computer system 150 to identify the account number of the recipient. The funds may then be deposited in the bank account of the recipient.

If, at step 321, the recipient is not a user that is registered at another member entity of the funds transfer payment network, then the process proceeds to step 331 illustrated in FIG. 3B. At step 331, the sponsor identification logic 182 of the payment service computer system 160 transmits inquiries to other payment networks (e.g., PayPal®, Star, Blink, Interlink, Plus, etc.), and it is determined if the token is associated with a user that is registered at another payment network. For example, the sponsor identification logic 182 may transmit an inquiry to a first payment network to inquire whether the recipient is registered at that payment network. If not, the sponsor identification logic 182 may continue to transmitting additional inquiries to other affiliated payment networks until the payment network at which the recipient has registered an account is identified. At step 333, if the recipient is registered with another payment network, information may also be stored in the information directory 168 identifying the payment network determined to be associated with that token, thereby facilitating additional funds transfers to that token in the future. Next, at step 335 the funds may be transferred to the recipient by routing the funds through the other payment network. Hence, in such an arrangement, funds may be pushed to a recipient that is not registered with the funds transfer payment network without the sender having to know or be concerned about whether the recipient is registered with the funds transfer payment network.

If, after the search of other payment networks is completed, no other payment network is identified at which the recipient is registered, then the recipient is presumed to not be a registered user of any payment network. Accordingly, at step 341, an invitation is sent to the recipient to invite the recipient to join the payment network. For example, if the token used by the sender is an e-mail address, then an e-mail is sent to the recipient informing that another user is attempting to transfer funds to the recipient and inviting the recipient to join the payment network. A link in the e-mail may, for example, deliver the recipient to the website provided by the bank computer system 120. As another example, if the token used by the sender is a cell phone number, the recipient may be sent a text message containing a URL inviting the recipient to join the payment network. As will be appreciated, the recipient may be sent such an invitation in other situations, e.g., if the recipient is not a registered user of the funds transfer payment network, even if the user is a registered user of another payment network.

At step 343, the recipient may be prompted to provide account information. At step 351, based on the account information, it may be determined whether the user is a customer of one of the member entities. For example, a bank routing number for a demand deposit account may be used to determine whether the user is a customer of one of the member entities. If the recipient is a customer of a member entity, then at step 353 the recipient may be transferred to the member entity for registration (e.g., the recipient bank in the example of FIG. 1). A unique ID is associated with the recipient in the information directory 158 of the recipient bank computer system 150 and in the information directory 168 of the payment service computer system 160. At step 355, the sender's registry is updated to include the recipient, including the unique identifier of the recipient. At step 357, the funds are transferred to the recipient.

If the recipient is not a customer of a member entity, then at step 363 the recipient is registered by the payment service computer system 160. At step 365, the sender's registry is updated to include an entry for the recipient, including the unique identifier of the recipient. At step 367, the funds are transferred to the recipient. As will be appreciated, if the recipient has customized fund transfer preferences, the fund transfer may be processed by the rules engine 188 according to the recipient preferences. Examples of token customization to reflect such preferences were previously described above in connection with rules engine 188 and token generation logic 190.

FIG. 4 is a screen shot of a web page 400 that may be provided to a user when the user selects a preferences tab. The web page 400 may be used to configure preferences in connection with the token management logic 129, 159 or 169 (depending on where the user registered for the payment network). Web page 400 includes a plurality of fields including a default notification settings field 401, a manage connections field 411, and a manage recipients field 431. The default notification settings field 401 presents the user with information regarding the current default notification settings for a funds transfer event. As shown in the screen shot in FIG. 4, notification settings field 401 may include settings to specify a telephone number to which automated telephone call notifications or text message notifications should be sent (field 403) and an e-mail address to which e-mail notifications should be sent (field 405). The user may also be permitted to specify the name on the account (field 407) as it should appear to other users when the other users receive a funds transfer notification. The information specified in field 407 may also be used in other situations, for example, when other users are searching for connections through a lookup service in information directory 128, 156, 168. The user may configure the rules engine 188 to notify the user regarding transactions based on the user preferences received from the user prior to the occurrence of the transactions. If the user fails to configure customized notification settings, default notification settings may be used. In various embodiments, a user may choose different/custom notification settings for each token that the user has registered.

In the example shown in FIG. 4, the telephone number that may receive a call, text message or voice message, upon the occurrence of a predetermined event is 949-555-7878. Additionally, the e-mail address that may be used to notify the user that a fund transfer has occurred from or to the user's accounts is pat@mail.com. The user may choose to be notified by e-mail or telephone or both.

The token field 413 may display a particular token that the user has registered or is in the process of registering. The status field 415 may display whether the token has been verified/unverified or is active/inactive. The receiving money field 417 is derived in part on the information in the status field and indicating whether a particular token is currently available for sending/receiving money. For example, for the inactive phone number (i.e., 650-555-5555), the user may send/receive funds using this token for connections established prior to the token becoming inactive. However, the user cannot establish new connections with other users based on this token. For example, this may be a mobile number that was previously owned by the user. Because a unique ID serves as the basis for funds transfers after a connection has been established, previously established connections are still valid (because they are based on the unique ID and not the mobile number), however, new connections are not permitted to be established (because another user may now be using the token).

The account number field 419 may display the type of account and a partial account number of an account that is associated with the token in field 413. Hence, funds sent/received using the token specified in field 413 are withdrawn from/deposited to the account specified in field 419. If an account number is not associated with the e-mail address or the mobile number in field 413, then the account number field 419 may display a message such as "account is not specified." The notification field 421 may indicate whether the default notification settings specified in field 701 are to be used for notifications or whether other/customized settings are to be used.

Actions field 423 may include various links that allow the user to take various actions. For example, links may include, edit, remove, and verify. If the status of a token is verified, then the edit field allows the user to edit attributes of the token as specified in the rules engine 188. For example, the accounts and notification preferences (fields 719 and 721) may be edited in greater detail. If the account number is verified, then the remove link may also be displayed. if the account is unverified or inactive, a verify link that sends an e-mail or a SMS and displays a verification code may be displayed. An edit and remove link may also be displayed for unverified or in active e-mail or telephone numbers. The user may also add new tokens using new connections link 425.

As will be apparent from fields 401 and 411, separate payment and notification channels may be used for funds transfers. For example, for the 415-555-4001 token, the payment channel occurs through the 415-555-4001 token, however, the notification channel occurs through the 949-555-7878 and pat@mail.com tokens. Additionally, if the user decides to set a custom notification channel for the 415-555-4001 token, the user can do so without disrupting connections that have already been established using the 415-555-4001 token. Disrupting one channel (e.g., by changing the token) does not impact the other channel.

The manage connections field 431 allows a user to perform various functions related to managing the user's connections with other users. Field 431 shows a registry of connections that have been established by a user. Within field 431 various information may be displayed regarding each other user, for example, name (field 433), nickname (field 435), e-mail/mobile (field 437), status (field 439), and actions (field 441) and a link that allows a user to add new recipients 443. Although not specifically shown, it will be appreciated that a unique ID may also be stored for each of the users in the registry shown in field 431. As previously indicated, the unique ID need not be known by the user and is maintained more securely.

The name field 433 may be the name of the recipient as it appears on the account associated with the other user (e.g., as specified by the other user). The nickname field 435 may be a nickname assigned to the other user (e.g., as specified by the user). The e-mail/mobile field 437 may display the public tokens that are being used by the recipient. The status field 437 may display whether a permanent connection has been established for a particular contact. Actions field 441 may be determined based on the status field. For example, if a link has been established, then the actions field 441 may display a link that allows a user to send money to the recipient. If a link has not been established, then the actions field may display a send money link, but the actions field 441 may also display a view details link. The view details link may display another screen to the user where the user may provide further details to establish a connection with a recipient. Other actions that may be displayed are edit and remove. Edit may allow the user to edit each field discussed above and remove may allow a user to remove a recipient and related information from the user's registry. A link 443 may be used to add additional users to the registry, e.g., via a search of information directories 128, 158 and/or 168.

In an example embodiment, the manage connections field 431 may present a message to the user that informs the user when another user is no longer the owner of a token. The message may include a link that allows the user to update the token information. In other embodiments, if the other user's information has changed, then the message presented by the manage connections field 431 may allow the user to update the outdated information.

Figure 5:
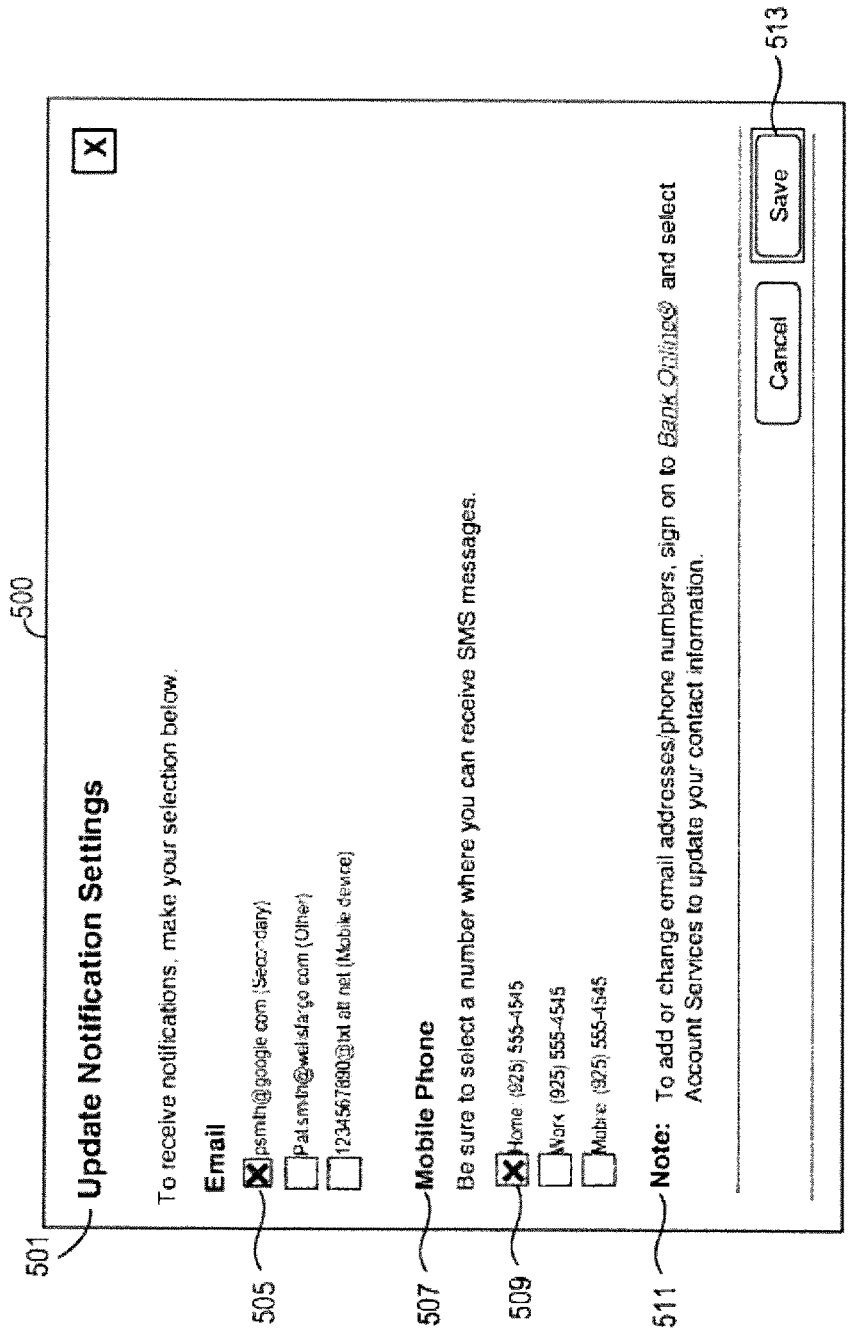
FIG. 5 is a screen shot of a web page that may be presented to a user to configure notification settings.

FIG. 5 is a screen shot of a form that allows a user to update default or custom notification settings. In FIG. 5, the user is provided with a list of e-mail addresses associated with the user's account. The user may use a checkbox to indicate which e-mail address should receive a notification. For example, the user in the screen shot shown in FIG. 5 has chosen e-mail address "psmith@google.com" by placing a check mark 505 in the appropriate field. In other embodiments, a user may choose multiple e-mail addresses instead of choosing a single e-mail address. Also shown on the screen shot are telephone numbers associated with the user accounts. The user may use a check mark 509 to select a phone number that receives a notification. In other embodiments, the user may choose multiple telephone numbers and multiple e-mail addresses for notification. A link 511 may allow the user to add e-mail addresses or telephone numbers to the account information maintained by the bank. In one embodiment, the user may select the link and the user may be automatically taken to a web portal provided by a banking institution. The user may click on save button 513 to save the notification changes implemented by the user.

FIG. 6 shows a screen shot of a web page 600 that may be presented to a user when the user selects the send money tab. The web page 600 may include a send money field 601 that the user may fill out to send money to a chosen recipient. The web page 600 may include a display of various payment channels 619 that are available to the user. The web page 600 may also include a field 630 showing details regarding recent transactions that are pending, returned or completed.

The send money form 601 may prompt the user to choose a recipient from a pull down menu 603. The list of recipients presented using menu 603 may be populated using the list of recipients contained in field 431 discussed in FIG. 4. The list of recipients menu 603 may contain the names of users that the user has sent funds to or received funds from in the past or that have been added in another manner. In one embodiment, the recipients may be identified by the nicknames assigned to each recipient. Since the nicknames may be directly correlated with the unique ID within the token management logic 129, the account information may be derived from the nicknames via the unique ID. Hence, as previously indicated, the connection between the two users is not disrupted when a cell phone number or e-mail address becomes obsolete. After choosing the recipient, the user may choose an account from which funds may be sent to the recipient using a drop down menu 605. The drop down menu may be pre-populated with a list of all accounts that are held by the user. The user may enter a dollar amount that the user would like to transfer to the recipient in the amount field 607. The user's name may be presented with an optional field description 609 that may allow the user to ascertain that the payment was for a particular product or service provided by the recipient. Another field may be auto-populated with the user's name as the sender of the funds. A nickname field 611 is also displayed if the recipient knows the user by a name that is different than the user's name as it appears on the user's account. The send money form 601 also displays links that allow the user to add recipients 615, manage recipients 617 and edit the current notification preferences 613.

The payment channels form 619 presented to the user may allow the user to choose various payment channels such as, credit card, ACH or PayPal®. Also displayed with each payment channel may be the funds available to recipient field 623. For example, the credit card method may make the funds available to the recipient within 2-days of processing the send request. However, the user may be charged a fee as indicated by field 625, for example, $5.00. In other examples, a user may choose ACH in field 621, however the funds may be available to the recipient in 4 days with no fee. Other payment channels, such as PayPal®, Star, Blink, Interlink, and Plus may also be presented to the user.

Field 630 shows a few of the most recent transactions that the user has performed. Additional recent transactions may be displayed via selection of a link to view more transfers and/or by selecting the transfer activity tab. Field 630 may display various fields that include information regarding the transactions. For example, such fields may include a date sent field 633, from account field 635, recipient field 637, amount field 639, description field 641, status field 643 and actions field 645. The date sent field 633 lists the date when the user initiated the send request. The from account field 635 may display the type of account (i.e. checking, savings, or money market) and a partial account number. The recipient field 637 may display the full name of the recipient. The amount field 639 displays the dollar amount sent to the recipient. The description field 641 displays the description that was entered by the user while processing the request. The status field 643 may inform the user whether the fund transfer is pending, returned or not processed, or has been completed. The actions field 645 may display a link that allows a user to view more details regarding the current status of the fund transfer.

In an alternative embodiment to FIGS. 3A and 3B, a sender may be able to send funds to a recipient who is not a registered user of any member of any payment network-either the funds transfer payment network or other existing payment networks. For example, a user at a participating bank (i.e., sending bank) through the sending bank's online interface, enters a token (e.g., cell phone number or email address) for a desired recipient and a dollar amount desired to be sent to the recipient. The dollar amount and the token are then sent to the funds transfer payment network for matching services. Because the recipient is either out of the funds transfer payment network or not part of any known payment network, or both, the funds transfer payment network fails to match the token in the payment network's directory. In response, the funds transfer payment network sends a message to the sending bank indicating that the token is unknown. The funds transfer payment network also creates a pending payment, which may include some or all of the following fields: unknown token, sending bank, dollar amount, user name, and recipient name.

The sending bank then sends a message to the recipient using the token. For example, the sending bank may send a message to the recipient that the user wants to send the recipient money. Alternatively, the funds transfer payment network sends the message to the recipient. If the recipient is not a registered user of any member of any payment network, the recipient is directed to a link to the website of the funds transfer payment network to begin the process of registering to receive the pending payment. If the token entered by the sender is the recipient's email address, the recipient receives the link at his or her email address. If the token entered by the sender is the recipient's cell phone number, the recipient receives the link at his or her cell phone number.

Figure 7:
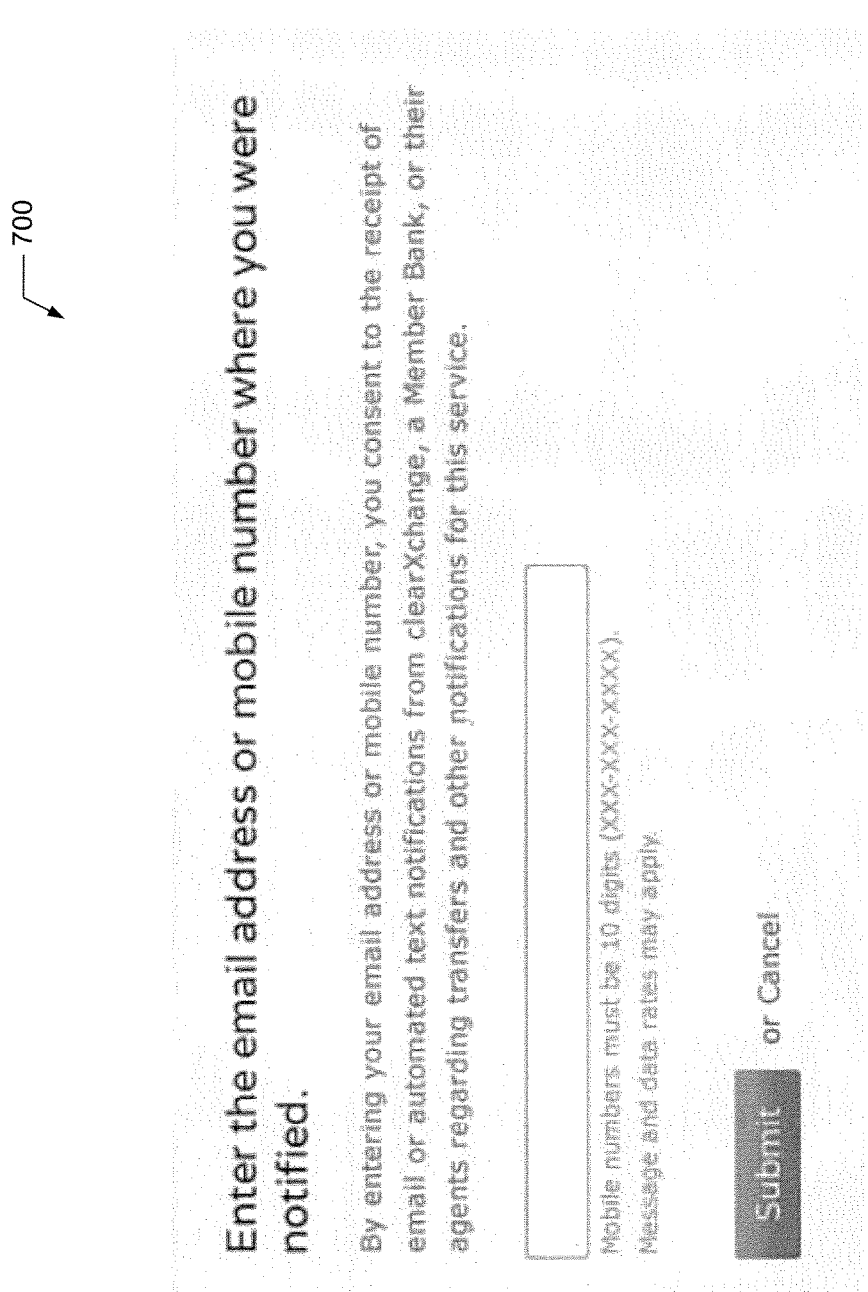
FIG. 7 is a screen shot of a web page that may be presented to an out-of-network user when an out-of-network user is sent a payment.

FIG. 7 shows a screen shot of an example web page 700 that may be presented to a recipient upon accepting an invitation in a link. As indicated in FIG. 7, the recipient is prompted to enter the token where the recipient was notified about the pending payment. The user enters the token in the field in web page 700. The funds transfer payment network matches the entered token to a pending payment. In one embodiment, the recipient can only proceed if the entered token matches an unknown token for a pending payment.

In one embodiment, a recipient who is not registered with any member of the funds transfer payment network can only join the funds transfer payment network and receive funds if a registered sender invites that non-registered recipient. The information and account ownership of the recipient may be validated and collected before the recipient can even join the funds transfer payment network. Thus, it should be appreciated that the funds transfer payment network may verify that a payment is pending before a non-registered out-of-network recipient can join the funds transfer payment network. Herein, "out-of-network" refers to users of financial institutions that are not members of the funds transfer payment network. Alternatively, "out-of-network" may also refer to financial institutions that are not members of the funds transfer payment network. An in-network user must send an out-of-network user a payment before the out-of-network user can join the funds transfer payment network. This may prevent fraud by ensuring that all users or entities involved in a transaction can be verified. Additionally, because out-of-network users must be invited to the funds transfer payment network by in-network users, fraud and fraudulent transactions are further reduced or eliminated.

Once the recipient is registered with the funds transfer payment network, the funds transfer payment network may send the recipient's bank account information to the sending bank to complete the initiation transaction. The transaction may be completed via ACH, for example. As is known in the art, ACH transactions may be a "pull" transaction or a "push" transaction. When an in-network user sends money to an out-of-network user, the sending bank may use a push transaction.

Figure 8:
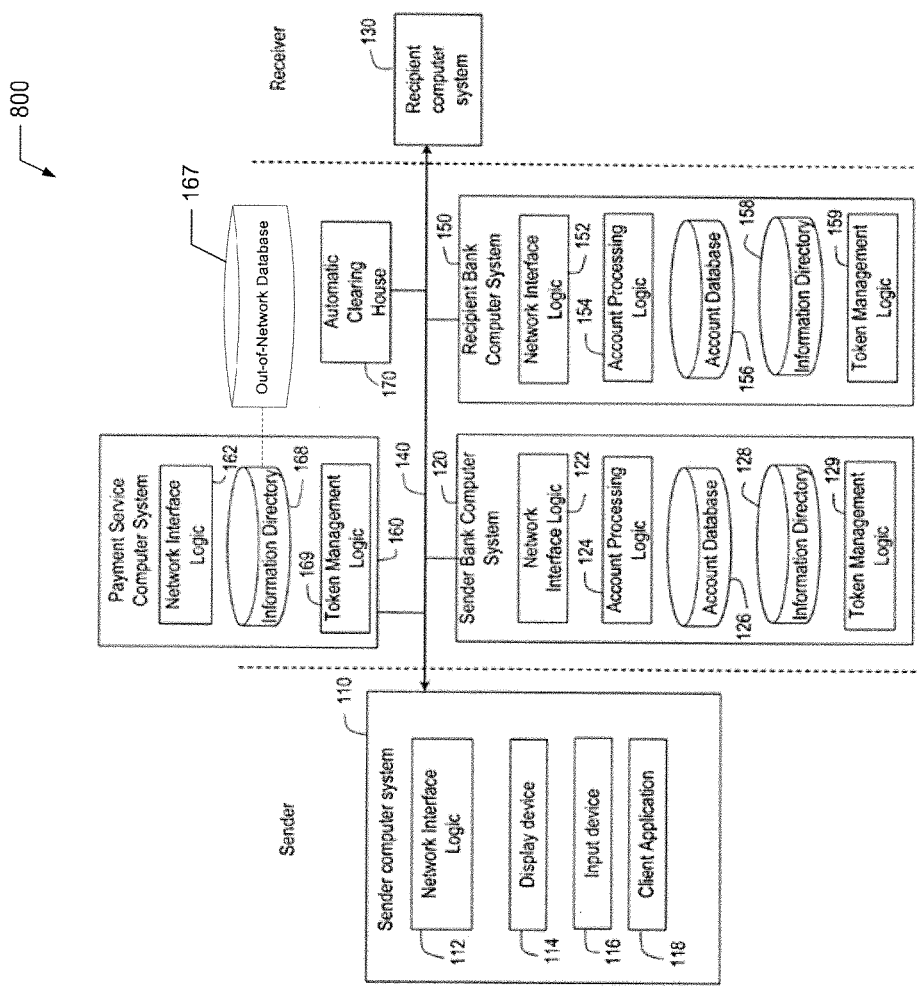
FIG. 8 is a schematic diagram of a funds transfer system in which a sender and a recipient use different banking institutions according to an example embodiment.

Once the recipient is a registered user of the funds transfer payment network, the funds transfer payment network and funds transfer system 100 may maintain information about the recipient in an out-of-network database. FIG. 8 illustrates an example funds transfer system 800. Funds transfer system 800 is similar to funds transfer system 100, except that the payment service computer system includes an out-of-network database 167. The out-of-network database 167 may store information collected during a financial transaction involving out-of-network users. For example, the funds transfer payment network may perform a funds transfer to an out-of-network user and may store bank information about the out-of-network recipient in the out-of-network database 167. In one embodiment, the funds transfer system 800 may store token and bank account information for out-of-network users in the out-of-network database 167.

In an alternative embodiment, the funds transfer system 800 stores bank account information for out-of-network users in the out-of-network database 167, but does not store token information for out-of-network users in the out-of-network database 167. Instead, the funds transfer payment network associates the recipient with a private identifier as described above. The private identifier may be stored in information directory 168. Alternatively, the private identifier may be stored in information directory 128, or information directory 158. Thus, the user's token information is stored in a separate directory, e.g., information directory 168, from the out-of-network database 167, and a user's bank account information is stored in the out-of-network database 167. It should be appreciated that this alternative embodiment increases user security by not storing a user's token and a user's bank information in the same database. It should also be appreciated that no publicly available information is stored with a user's bank information, thereby reducing the risk of fraud or theft. Thus, the funds transfer payment network can securely process payments and transactions for out-of-network recipients by using a private identifier to match a recipient's token to the recipient's bank information.

In one embodiment, information directory 168 does not store bank account information. Although the out-of-network database 167 is shown outside of payment service computer system 160 in FIG. 8, in one embodiment, the out-of-network database 167 may reside inside payment service computer system 160.

Figure 9:
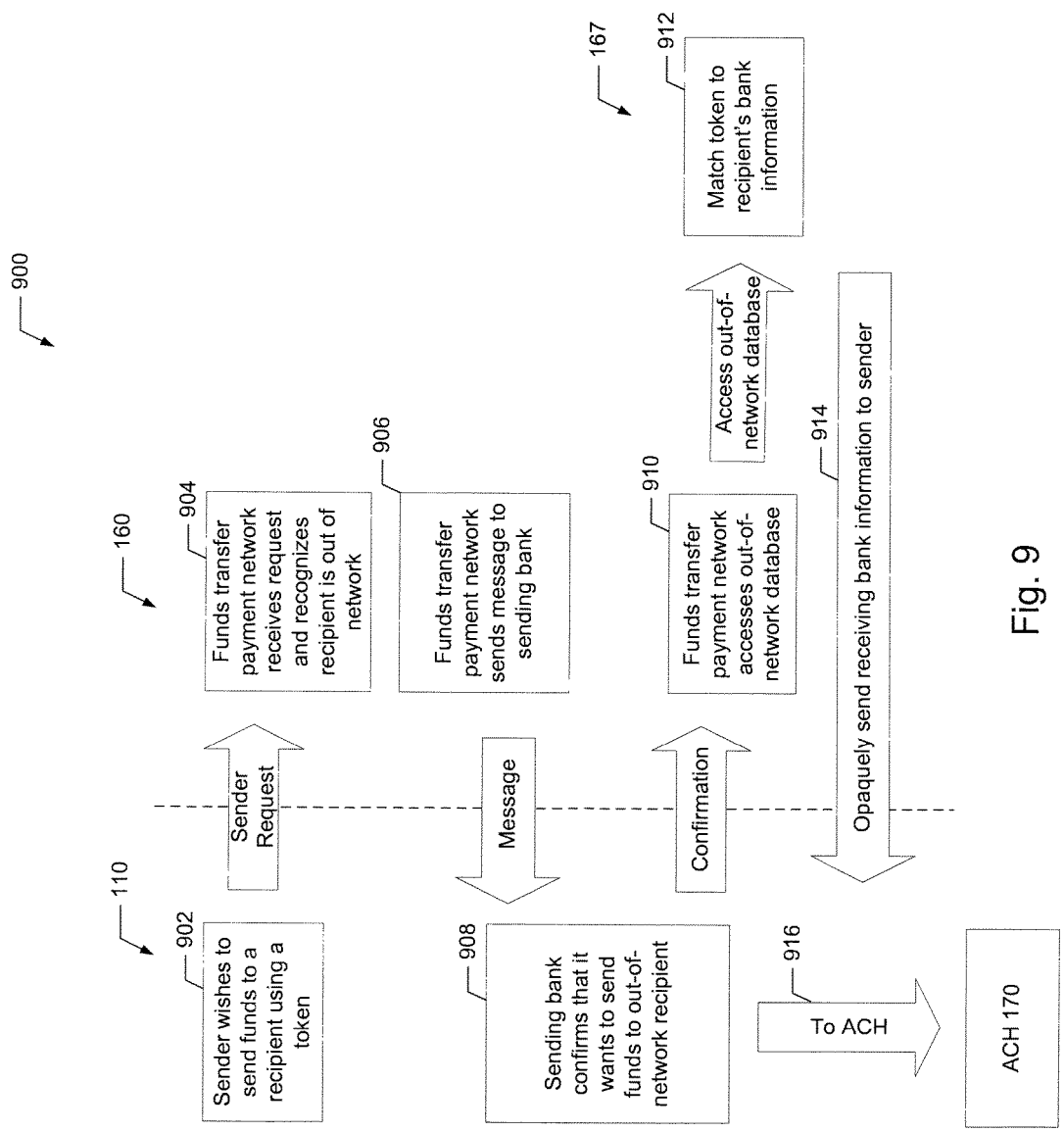
FIG. 9 is a flow diagram illustrating an example process for facilitating transfer of funds to an out-of-network recipient according to an example embodiment.

In future transactions involving the recipient, the funds transfer payment network utilizes the out-of-network database 167 to facilitate the transfer funds of funds from a member. FIG. 9 is a flow diagram illustrating an example process 900 for facilitating payment or transfer of funds to an out-of-network recipient, according to an example embodiment of the present invention. Although the process 900 is described with reference to the flow diagram illustrated in FIG. 9, it will be appreciated that many other methods of performing the acts associated with the process 900 may be used. For example, the order of many of the blocks may be changed, certain blocks may be combined with other blocks, and many of the blocks described are optional.

To pay funds to an out-of-network recipient whose information is already stored in out-of-network database 167, data may flow between a sender computer system 110, a funds transfer payment network that uses or implements payment service computer system 160, including out-of-network database 167, and recipient computer system 130. A sender may wish to send funds to a recipient using a token, as shown in block 902. The sending bank sends the token and dollar amount to the funds transfer payment network. The funds transfer payment network notes that the token is for an out-of-network recipient, as shown in block 904, and sends a message to the sending bank indicating the recipient is an out-of-network recipient, as shown in block 906. The sending bank may send a confirmation to the funds transfer payment network to continue the transaction, as shown in block 908. Upon receiving confirmation, the funds transfer payment network accesses the separate out-of-network database 167, as shown in block 910. The funds transfer payment network matches the token to the recipient's bank information stored in out-of-network database 167, as shown in block 912. The funds transfer payment network encrypts the receiving bank account information and opaquely sends the recipient's bank account information to the sending back, as shown in block 914. The sending bank decrypts and sends the recipient's bank account information and any other information required to complete the transaction to ACH 170.

The funds transfer system 100 also allows communications to non-customers of a financial institution. For example, once a bank is a member of the funds transfer payment network, that bank may be able to send messages to users who are not customers of that bank. Thus, the funds transfer payment network can behave as a communications intermediary. For example, when a new user is prompted to sign up to register with a member entity, that user may be presented a screen that expressly gains approval to send that user messages. In other words, the user must agree in one embodiment to receive messages from members as a condition of joining the funds transfer payment network and the funds transfer system 100. Therefore, once a user is signed up, that user can be contacted by other members.

In one embodiment, financial institutions who are members of the funds transfer payment network are able to send, receive and request funds on behalf of their customers to non-customers. Thus, it should be appreciated that a financial institution that is a member of the funds transfer payment network can help its customers do business with other entities who are not customers of that financial institution.

In one embodiment, the funds transfer system 100 may track the status of payments and provide notifications to a sender and recipient as to the status of payments.

In one embodiment, information is encrypted by a sender bank and decrypted by a receiver bank so that the payment network does not have access to any of the sender or receiver information. For example, the sender bank may use an encryption algorithm that is known by the receiver bank but is not known by a funds transfer payment network. In this case, the sending bank encrypts the account information before any information is given to the payment network. The payment network processes the information, including transferring encrypted sender and receiver information to the receiving bank. The receiving bank knows how to decrypt the encrypted information. In this manner the payment network cannot access any information being communicated by one bank to another bank. The entire transfer of funds is thus opaque to the funds transfer payment network.

In one embodiment, the funds transfer system 100 relies on the banks' existing fraud systems to manage risks. In one embodiment, the payment system does not actually move any money from one entity to another or one bank to another. There is no account owned by the payment service that can even hold money, even for a temporary period of time. The payment system in one embodiment only facilitates the transfer of money from one bank to another bank.

In one embodiment, the funds transfer system 100 or funds transfer payment network may send a payment from an out-of-network user to an in-network user. The funds transfer payment network may create a separate out-of-network database for storing information about the out-of-network sender or utilize an existing database.

In one embodiment, a user of a member bank may be able to present a bill or invoice using the funds transfer system 100. The bill may be presented to a consumer of a product or service provided by the user of the member bank. The consumer may be an in-network user or an out-of-network user. A bill presentment may include an electronic file, e.g., an Adobe PDF® document, a Microsoft Word® document, a text file, an image file or any other suitable document that displays a bill to the consumer. The electronic file, e.g., an Adobe PDF® document, may include terms for payment provided by the biller. In one embodiment, the funds transfer system 100 may present other items besides bills, such as mortgage documents, business documents, subpoenas, or patent filings or applications, for example.

The funds transfer system 100 may also be used to securely present documents where the bank verifies the identity of the consumer receiving the documents. The sender can also use the bank to verify receipt of the documents. In one embodiment, the biller can track whether the consumer has received the bill. For example, the biller may receive a notification from the funds transfer system 100 that the consumer received the bill. The sender may also be able to confirm that the consumer viewed the bill, e.g., opened or accessed the electronic file on a computer or mobile phone. It should be appreciated that receipt verification or tracking is useful because the biller can confirm, and the consumer cannot deny, that the consumer received the bill.

For an in-network bill presentment, the biller sends a request for money, or a bill or invoice, to the funds transfer payment network. The request or the bill includes a token identifying the recipient of the bill, or the consumer. The biller appends a request ID to the payment ID and sends the bill to the funds transfer payment network. The biller may also be able to add payment instructions to the bill. The funds transfer payment network routes the bill or invoice to the consumer based upon the token. The consumer responds by paying. The funds transfer payment network then notifies the biller of payment. A payment ID is sent to the bank and is then matched to the account. It should be appreciated that the biller or the biller's bank does not need to have the routing and account number of the consumer, thereby increasing security and convenience for the consumer and the biller.

For out-of-network consumers, instead of sending a payment ID with a request ID, the funds transfer payment network provides instructions to the billing bank to debit an account. The funds transfer payment network also provides the consumer's ACH information plus the payment ID, plus the request ID to the biller's bank to debit.

In one embodiment, an out-of-network user may be able to send payments to a member bank customer even if the member bank customer did not send a payment request to the out-of-network user. Thus, registered out-of-network users, i.e., users who appear in the out-of-network database 167, can send money to a customer of a member bank. The member bank customers can receive money using that member bank customer's channel of choice. It should be appreciated that the member bank customer does not have to provide perceived confidential information, such as bank account numbers, to out-of-network users from whom they want to receive money. The funds transfer system 100 may be used for debit accounts, electronic funds transfers, credit card transactions, Amazon® payments, payments that are facilitated simply via electronic mail, business to business or merchant payments, expedited payments and scheduled payments, such as for rent, a housekeeper, or a weekly babysitter. In one embodiment, the funds transfer payment network verifies account access via trial deposits. The sender gives amounts of transactions and the funds transfer system 100 verifies that the out-of-network sender has access to an account and has authorized the debit transaction.

In one embodiment, the out-of-network users sending money may be subject to send limits. The send limit amounts may be for per day, per rolling seven-day or per rolling 30-day time periods. The send limits may be enforced for each out-of-network user regardless of the destination of the payments. If an out-of-network user attempts to send a payment exceeding a send limit, the funds transfer system 100 may inform the out-of-network user that the payment exceeds the send limit. In one embodiment, the funds transfer payment network can impose transaction fees when an out-of-network user sends money to a customer of a member bank.

The decision to accept and execute a money transfer from an out-of-network consumer who wishes to send money may be managed by the member bank, i.e., the bank of the in-network user receiving the money. As described above with respect to the out-of-network database 167, out-of-network users must enroll for the out-of-network service before being able to send money to a member bank customer. Thus, it should be appreciated that an out-of-network user who is registered may be able to both initiate a payment to a registered customer of a member bank and respond to a request for money (e.g., a bill) from a customer of a member bank.

The debit transactions from an out-of-network user's bank account may be originated via ACH rails by the member banks. In one embodiment, the member bank requires at least one of the following to process a transaction via ACH rails: sender name, transaction amount, transaction fee, recipient profile ID, recipient name as provided by the sender, payment memo, initiation date, bank account number, routing number, and an account type, e.g., checking or savings. When an out-of-network user sends money to an in-network user, the sending bank may use a pull transaction.

For security purposes, in one embodiment, out-of-network users may not be allowed to initiate requests for payments and may also not be allowed to send payments to other out-of-network users. It should be appreciated that these features prevent fraud and also encourage financial institutions to join the funds transfer payment network.

FIG. 10 is a flow diagram illustrating an example process 1000 for facilitating payment or transfer of funds from an out-of-network sender to an in-network recipient, according to an example embodiment of the present invention. Although the process 1000 is described with reference to the flow diagram illustrated in FIG. 10, it will be appreciated that many other methods of performing the acts associated with the process 1000 may be used. For example, the order of many of the blocks may be changed, certain blocks may be combined with other blocks, and many of the blocks described are optional.

To send funds from an out-of-network sender whose information is already stored in out-of-network database 167 to an in-network recipient, data may flow between a sender computer system 110, a funds transfer payment network that uses or implements payment service computer system 160, including out-of-network database 167, and recipient computer system 130. A sender may wish to send funds to a recipient using a token, as shown in block 1002. The sending bank sends the token and dollar amount to the funds transfer payment network. The funds transfer payment network notes that the request is from an out-of-network sender as shown in block 1004. The funds transfer payment network may verify account access using trial deposits, as shown in block 1006. The funds transfer payment network sends a message to the receiving bank indicating the sender is an out-of-network sender, as shown in block 1008. The receiving bank may send a confirmation to the funds transfer payment network to continue the transaction, as shown in block 1010. Upon receiving confirmation, the funds transfer payment network accesses the separate out-of-network database 167, as shown in block 1012. The funds transfer payment network matches the sender to the sender's bank information stored in out-of-network database 167, as shown in block 1014. The funds transfer payment network encrypts the sending bank account information and opaquely sends the sending bank's account information to the receiving back, as shown in block 1016. The receiving bank decrypts and sends the sender's account information and any other information required to complete the transaction to ACH 170.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other non-transitory medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand held devices, multi processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method comprising:
receiving a first funds transfer request from a first sender through a computer network, the first funds transfer request to facilitate a transfer of first funds to a recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of a computer-implemented funds transfer payment network, and the second financial institution not being a registered financial institution member of the computer-implemented funds transfer payment network;
determining that the recipient is not a registered user of the computer-implemented funds transfer payment network;
automatically transmitting an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;
receiving a response to the invitation from the recipient, the response including an indication that the recipient would like to be a registered user of the computer-implemented funds transfer payment network;
collecting, from the response, identifying information that identifies the recipient, the identifying information including the account number of the account of the recipient at the second financial institution;
creating a record for the recipient in a database of registered users contained in the computer-implemented funds transfer payment network, the record including the token for the recipient, and at least some of the identifying information, and the record including the account number of the account of the recipient at the second financial institution;
sending a message to the first financial institution indicating that the recipient is newly registered; and
based upon receiving a request from the first financial institution in response to the message:
encrypting the account number of the account of the recipient to generate an encrypted account number; and
providing the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender,
wherein:

creating the record for the recipient is conditioned upon a pending payment from the first sender that was initiated by the first sender using the token for the recipient.

2. The method of claim 1, further comprising sending a notification to the first sender regarding a status of the transfer of the first funds.

3. The method of claim 1, further comprising gaining approval of the recipient to receive other funds transfer requests from other members of the computer-implemented funds transfer payment network as a condition for registering with the computer-implemented funds transfer payment network.

4. The method of claim 3, further comprising allowing any of the other members of the computer-implemented funds transfer payment network to contact the recipient using the token for the recipient after approval of the recipient is received.

5. The method of claim 1, wherein the token for the recipient is the email address of the recipient.

6. The method of claim 1, further comprising:
  receiving a second funds transfer request from a second sender to the recipient, the second funds transfer request to facilitate transfer of second funds, the second funds being transferred using the ACH network from an account of the second sender at a third financial institution to the account of the recipient at the second financial institution, and the second funds transfer request including the token for the recipient but not including the account number or the encrypted account number of the account of the recipient;
  determining that the recipient is a registered user with the computer-implemented funds transfer payment network based on the record;
  providing the account number or the encrypted account number of the account of the recipient from the record to the third financial institution to enable the third financial institution to initiate transfer of the second funds from the account of the second sender to the account of the recipient using the ACH network.

7. The method of claim 1, further comprising:
  receiving a second funds transfer request from the recipient, the second funds transfer request to facilitate transfer of second funds to a transferee, the second funds being transferred using the ACH network from the account of the recipient at the second financial institution to an account of the transferee at a third financial institution, and the second funds transfer request including a token for the transferee;
  determining that the recipient is registered with the computer-implemented funds transfer payment network;
  determining that the third financial institution is a registered financial institution member of the computer-implemented funds transfer payment network;
  accessing the record; and
  providing the encrypted account number of the account of the recipient to the third financial institution to enable the third financial institution to debit the second funds from the account of the recipient using the ACH network, wherein the account number of the account of the recipient is not shared with the transferee, and the encrypted account number of the account of the recipient is not shared with the transferee.

8. The method of claim 1, wherein the response to the invitation from the recipient further includes a routing number of the second financial institution and wherein the method further comprises providing the routing number to the first financial institution to enable the first financial institution to initiate the transfer of the first funds from the account of the first sender to the account of the recipient using the ACH network.

9. The method of claim 8, further comprising verifying the routing number before providing the routing number to the first financial institution.

10. The method of claim 1, wherein the recipient is checked against an identity database before providing the encrypted account number of the account of the recipient to the first financial institution.

11. A method comprising:
  providing, before receiving a first funds transfer request, a first list of potential recipients to a first instance of an interface to be displayed to a first sender, each potential recipient of the first list of potential recipients being registered users of a computer-implemented funds transfer payment network, wherein a recipient is not identified in the first list of potential recipients and the first funds transfer request is provided using the first instance of the interface;
  receiving the first funds transfer request from the first sender through a computer network, the first funds transfer request to facilitate a transfer of first funds to the recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of the computer-implemented funds transfer payment network, and the second financial institution not being a registered financial institution member of the computer-implemented funds transfer payment network;
  determining that the recipient is not a registered user of the computer-implemented funds transfer payment network;
  automatically transmitting an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;
  receiving a response to the invitation from the recipient, the response including an indication that the recipient would like to be a registered user of the computer-implemented funds transfer payment network;
  collecting, from the response, identifying information that identifies the recipient, the identifying information including the account number of the account of the recipient at the second financial institution;
  creating a record for the recipient in a database of registered users contained in the computer-implemented funds transfer payment network, the record including the token for the recipient and at least some of the identifying information, and the record including the account number of the account of the recipient at the second financial institution;

encrypting the account number of the account of the recipient to generate an encrypted account number;

providing the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender; and providing, before receiving a second funds transfer request from a second sender to the recipient, a second list of potential recipients to a second instance of the interface to be displayed to the second sender, each potential recipient of the second list of potential recipients being registered users of the computer-implemented funds transfer payment network, wherein the recipient is identified in the second list of potential recipients and the second funds transfer request is provided using the second instance of the interface, wherein:

creating the record for the recipient is conditioned upon a pending payment from the first sender that was initiated by the first sender using the token for the recipient.

12. A system comprising:

a processor;

network interface logic configured to control the processor to:

receive a first funds transfer request from a first sender through a computer network, the first funds transfer request to facilitate a transfer of first funds to a recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of a computer-implemented funds transfer payment network, and the second financial institution not being a registered financial institution member of the computer-implemented funds transfer payment network;

determine that the recipient is not a registered user of the computer-implemented funds transfer payment network;

automatically transmit an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;

receive a response to the invitation from the recipient, the response including an indication that the recipient would like to be a registered user of the computer-implemented funds transfer payment network;

collect, from the response, identifying information that identifies the recipient, the identifying information including the account number of the account of the recipient at the second financial institution;

create a record for the recipient in a database of registered users contained in the computer-implemented funds transfer payment network, the record including the token for the recipient and at least some of the identifying information, and the record including the account number of the account of the recipient at the second financial institution;

send a message to the first financial institution indicating that the recipient is newly registered; and based upon receiving a request from the first financial institution in response to the message:

encrypting the account number of the account of the recipient to generate an encrypted account number; and provide the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender; and an information directory configured to store information associated with the record, wherein:

creating the record for the recipient is conditioned upon a pending payment from the first sender that was initiated by the first sender using the token for the recipient.

13. A nontransitory computer readable medium comprising instructions executable by a processor, the instructions being executable to perform a method, the method comprising:

receiving a first funds transfer request from a first sender through a computer network, the first funds transfer request to facilitate a transfer of first funds to a recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of a computer-implemented funds transfer payment network, and the second financial institution not being a registered financial institution member of the computer-implemented funds transfer payment network;

determining that the recipient is not a registered user of the computer-implemented funds transfer payment network;

automatically transmitting an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;

receiving a response to the invitation from the recipient, the response including an indication that the recipient would like to be a registered user of the computer-implemented funds transfer payment network;

collecting, from the response, identifying information that identifies the recipient, the identifying information including the account number of the account of the recipient at the second financial institution;

creating a record for the recipient in a database of registered users contained in the computer-implemented funds transfer payment network, the record including the token for the recipient and at least some of the identifying information, and the record including the account number of the account of the recipient at the second financial institution;

sending a message to the first financial institution indicating that the recipient is newly registered; and based upon receiving a request from the first financial institution in response to the message:
  encrypting the account number of the account of the recipient to generate an encrypted account number; and
  providing the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender,
wherein:
  creating the record for the recipient is conditioned upon a pending payment from the first sender that was initiated by the first sender using the token for the recipient.

14. A system comprising:
a processor;
network interface logic configured to control the processor to:
  provide, before receiving a first funds transfer request, a first list of potential recipients to a first instance of an interface to be displayed to a first sender, each potential recipient of the first list of potential recipients being registered users of a computer-implemented funds transfer payment network, wherein a recipient is not identified in the first list of potential recipients and the first funds transfer request is provided using the first instance of the interface;
  receive the first funds transfer request from the first sender through a computer network, the first funds transfer request to facilitate a transfer of first funds to the recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of the computer-implemented funds transfer payment network, and the second financial institution not being a registered financial institution member of the computer-implemented funds transfer payment network;
  determine that the recipient is not a registered user of the computer-implemented funds transfer payment network;
  automatically transmit an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;
  receive a response to the invitation from the recipient, the response including an indication that the recipient would like to be a registered user of the computer-implemented funds transfer payment network;
  collect, from the response, identifying information that identifies the recipient, the identifying information including the account number of the account of the recipient at the second financial institution;
  create a record for the recipient in a database of registered users contained in the computer-implemented funds transfer payment network, the record including the token for the recipient and at least some of the identifying information, and the record including the account number of the account of the recipient at the second financial institution;
  encrypting the account number of the account of the recipient to generate an encrypted account number;
  provide the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender; and
  provide, before receiving a second funds transfer request from a second sender to the recipient, a second list of potential recipients to a second instance of the interface to be displayed to the second sender, each potential recipient of the second list of potential recipients being registered users of the computer-implemented funds transfer payment network, wherein the recipient is identified in the second list of potential recipients and the second funds transfer request is provided using the second instance of the interface; and
an information directory configured to store information associated with the record,
wherein:
  creating the record for the recipient is conditioned upon a pending payment from the first sender that was initiated by the first sender using the token for the recipient.

15. A nontransitory computer readable medium comprising instructions executable by a processor, the instructions being executable to perform a method, the method comprising:

providing, before receiving a first funds transfer request, a first list of potential recipients to a first instance of an interface to be displayed to a first sender, each potential recipient of the first list of potential recipients being registered users of a computer-implemented funds transfer payment network, wherein a recipient is not identified in the first list of potential recipients and the first funds transfer request is provided using the first instance of the interface;

receiving the first funds transfer request from the first sender through a computer network, the first funds transfer request to facilitate a transfer of first funds to the recipient, the first funds being transferred using an automatic clearing house (ACH) network from an account of the first sender at a first financial institution to an account of the recipient at a second financial institution, the first funds transfer request including a token for the recipient but not including an account number of the account of the recipient at the second financial institution, the token for the recipient comprising at least one of an email address of the recipient or a phone number of the recipient, the first financial institution being a registered financial institution member of the computer-implemented funds transfer payment network, and the second financial institution not being a registered financial institution member of the computer-implemented funds transfer payment network;

determining that the recipient is not a registered user of the computer-implemented funds transfer payment network;

automatically transmitting an invitation to the recipient to join the computer-implemented funds transfer payment network, the invitation being directed to the recipient using the token for the recipient from the first funds transfer request by sending the invitation to at least one of the email address of the recipient or the phone number of the recipient, and the invitation being automatically generated;

receiving a response to the invitation from the recipient, the response including an indication that the recipient would like to be a registered user of the computer-implemented funds transfer payment network;

collecting, from the response, identifying information that identifies the recipient, the identifying information including the account number of the account of the recipient at the second financial institution;

creating a record for the recipient in a database of registered users contained in the computer-implemented funds transfer payment network, the record including the token for the recipient and at least some of the identifying information, and the record including the account number of the account of the recipient at the second financial institution;

encrypting the account number of the account of the recipient to generate an encrypted account number;

providing the encrypted account number of the account of the recipient to the first financial institution to enable the first financial institution to initiate the transfer of the first funds from the account of the first sender to the account of the recipient in a single ACH transfer from the first financial institution to the second financial institution using the ACH network, wherein the account number of the account of the recipient is not shared with the first sender, and the encrypted account number of the account of the recipient is not shared with the first sender; and providing, before receiving a second funds transfer request from a second sender to the recipient, a second list of potential recipients to a second instance of the interface to be displayed to the second sender, each potential recipient of the second list of potential recipients being registered users of the computer-implemented funds transfer payment network, wherein the recipient is identified in the second list of potential recipients and the second funds transfer request is provided using the second instance of the interface, wherein:
creating the record for the recipient is conditioned upon a pending payment from the first sender that was initiated by the first sender using the token for the recipient.

* * * * *